US007990909B2

(12) United States Patent
Brueckheimer

(10) Patent No.: US 7,990,909 B2
(45) Date of Patent: Aug. 2, 2011

(54) SYNCHRONIZATION OF NETWORK NODES

(75) Inventor: Simon Daniel Brueckheimer, London (GB)

(73) Assignee: Ciena Corporation, Linthicum, MD (US)

(*) Notice: Subject to any disclaimer, the term of this patent is extended or adjusted under 35 U.S.C. 154(b) by 144 days.

(21) Appl. No.: 12/262,232

(22) Filed: Oct. 31, 2008

(65) Prior Publication Data

US 2009/0147806 A1   Jun. 11, 2009

Related U.S. Application Data

(60) Provisional application No. 60/984,919, filed on Nov. 2, 2007.

(51) Int. Cl.
*H04B 7/212* (2006.01)
(52) U.S. Cl. ......................................... 370/324; 370/350
(58) Field of Classification Search .................. 370/324, 370/350
See application file for complete search history.

(56) References Cited

U.S. PATENT DOCUMENTS

| 5,640,388 | A * | 6/1997 | Woodhead et al. | 370/468 |
| 5,872,774 | A * | 2/1999 | Wheatley et al. | 370/335 |
| 6,012,096 | A * | 1/2000 | Link et al. | 709/233 |
| 6,072,809 | A * | 6/2000 | Agrawal et al. | 370/503 |
| 6,577,648 | B1 * | 6/2003 | Raisanen et al. | 370/503 |
| 6,771,629 | B1 * | 8/2004 | Preston et al. | 370/337 |
| 6,920,155 | B2 * | 7/2005 | Rao | 370/503 |
| 7,787,438 | B2 * | 8/2010 | Dowse | 370/350 |
| 2001/0037409 | A1 * | 11/2001 | Ricciulli | 709/310 |
| 2003/0115321 | A1 * | 6/2003 | Edmison et al. | 709/224 |
| 2004/0109519 | A1 | 6/2004 | Mizukami et al. | |
| 2005/0152330 | A1 * | 7/2005 | Stephens et al. | 370/350 |
| 2005/0232384 | A1 * | 10/2005 | Heid et al. | 375/354 |
| 2006/0034196 | A1 * | 2/2006 | Casey | 370/278 |
| 2007/0127919 | A1 * | 6/2007 | Kallstenius | 398/25 |
| 2009/0059962 | A1 * | 3/2009 | Schmidt et al. | 370/503 |

FOREIGN PATENT DOCUMENTS

EP   1239620 A2   9/2002

OTHER PUBLICATIONS

Kannisto et al., "Precision Time Protocol Prototype on Wireless LAN," Telecommunications and Networking—ICT 2004; [Lecture notes in Computer Science; LNCS]; Springer-Verlag, Berlin/Heidelberg, vol. 3124, pp. 1236-1245 (Jul. 17, 2004), XP019009251, ISBN: 978-3-540-22571-3.

(Continued)

*Primary Examiner* — Kwang B Yao
*Assistant Examiner* — Juvena Loo
(74) *Attorney, Agent, or Firm* — Christopher & Weisberg, P.A.

(57) ABSTRACT

A method and apparatus are provided to achieve frequency synchronization between a first clock at a first node and a second clock at a second node of a packet-carrying communications network. At the first node: a property of packet transmission through the network between the first node and the second node is measured; and the measurement of the property is sent to the second node. At the second node, the same property of packet transmission through the network between the first node and the second node is measured. The measurement of the property made at the first node and the measurement of the property made at the second node are used to synchronize the frequency of the second clock with respect to the first clock.

28 Claims, 16 Drawing Sheets

OTHER PUBLICATIONS

Fasbender et al., "On Assessing Unidirectional Latencies in Packet-Switched Networks," Communications, 1997, ICC '97 Montreal, Towards the Knowledge Millennium, 1997 IEEE International Conference on Montreal, Quebec, Canada (Jun. 8-12, 1997), NY, NY USA, IEEE, US vol. 1, pp. 490-494 (Jun. 8, 1997), XP010227065, ISBN: 978-0-7803-3925-5.

International Search Report and Written Opinion dated Dec. 30, 2008 for International Application No. PCT/EP2008/064833, International Filing Date Oct. 31, 2008 (19 pages).

* cited by examiner

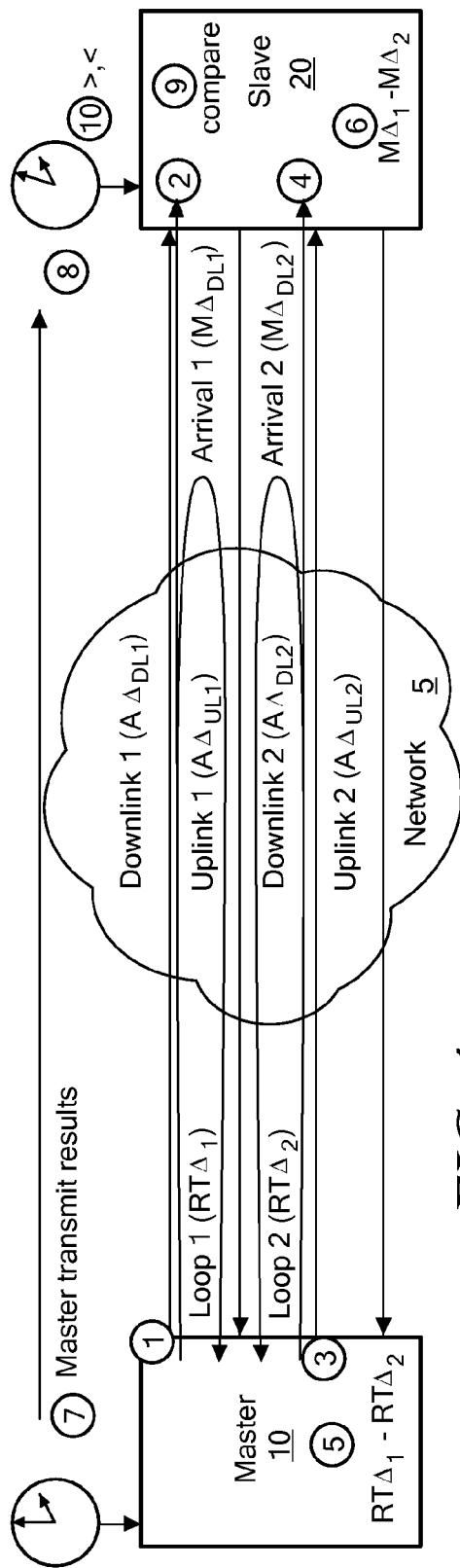
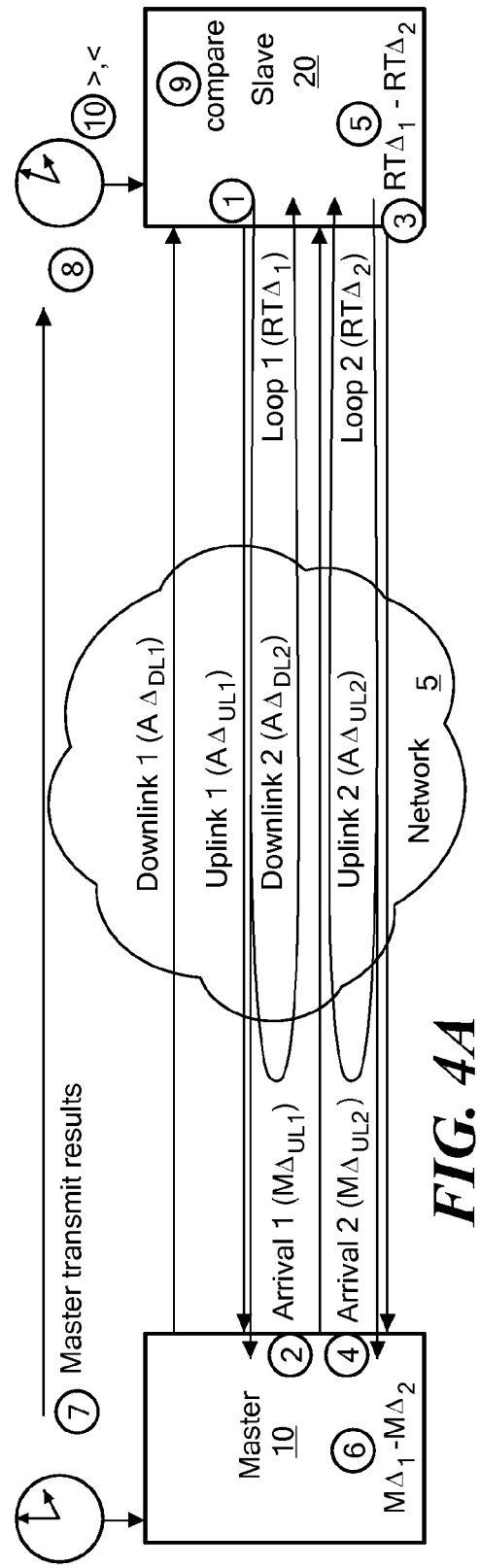
FIG. 4
FIG. 4A

SYNCHRONIZATION OF NETWORK NODES

CROSS-REFERENCE TO RELATED APPLICATIONS

This application is related to and claims priority to U.S. Provisional Patent Application No. 60/984,919, entitled SYNCHRONIZATION OF NETWORK NODES, filed Nov. 2, 2007, the entire contents of which are incorporated herein by reference.

STATEMENT REGARDING FEDERALLY SPONSORED RESEARCH OR DEVELOPMENT n/a

FIELD OF THE INVENTION

This invention relates to synchronizing clocks or references at different nodes of a network.

BACKGROUND OF THE INVENTION

In many types of network there is often a need for a common frequency reference. A frequency reference may be used directly, or may be used to determine phase and time-of-day. In a communications network, one requirement for the frequency reference is to ensure that service buffers do not over or underflow, especially for long-lived information flows, and certain services also require phase control and time to various degrees of accuracy, which relies on the local availability of an accurate frequency reference.

Atomic references are some of the most stable references available today, but they are prohibitively expensive for many applications. The Global Positioning System (GPS) and other navigational satellite systems can be used for these purposes, but still add significantly to the cost of low-end applications, and the antennas for these satellite signals are expensive to install, not always possible to site, and the signal is easily jammed. Affordable local oscillators can exhibit significant frequency drift in use. There are various known techniques for synchronizing slave oscillators with a master reference oscillator. The physical layer of a network can be used to disseminate frequency synchronization information by extracting a clock signal from the line code protocol used to code data traffic, or by extracting a clock signal from regular data transitions. This technique must be designed into the physical layer protocol of the network from the outset, and is typically used on a per-link basis. To extend this to distribute frequency throughout a communications network also requires that the synchronization systems of all the switching nodes forming the chain between the service entry point (master) and exit point (slave) extract the frequency from a reference link and disseminate it on all output links with a high degree of accuracy. However the challenge with the physical layer method is that as the length of the distribution node and link chain increases, the frequency signal degrades as each successive node is traversed. These impairments are traditionally termed jitter and wander and for performance purposes must be minimised.

While the method is reasonably reliable, and has been used extensively in Synchronous Digital Hierarchy (SDH) networks, this has not been hitherto true of packet network nodes that do not rely on an SDH layer or that do not function as part of a transmission layer. There has been no need to provide an SDH-like synchronization capability because packet networks are asynchronous in operation. In particular, packet network physical links such as Ethernet do not perform to anywhere near similar accuracy as SDH. Furthermore, each Ethernet link operates autonomously from all other Ethernet links on the same node.

The ability to replace SDH networks with packet networks relies on the ability to replace the frequency distribution architecture of SDH. Wireless basestations also require high quality frequency (and often phase) references and need to benefit from the opex and capex savings of packet networks. Applying the physical layer method directly to packet networks would incur a complete redesign of all the nodes and possibly even the physical layer protocols and devices. Unless packet network nodes are upgraded to send frequency synchronization in a native packet physical layer protocol, the only alternative is to use packet transmission directly i.e. use the packet layer above the physical layer for synchronization purposes. One simple method is to use packets to disseminate, on some regular basis, timestamps generated from the master's clock to all slave clocks. Each slave can derive frequency from the timestamps. However, the packet layer is not a constant communications channel, and it is highly susceptible to load variations at the packet switching nodes where varying amounts of traffic from varying numbers of source links desires to exit on one link. This load variation gives rise to generally unpredictable statistics that causes packet arrival on any route between a master and slave to vary in its transfer delay (load induced packet jitter, or just load jitter) as well as potentially suffer lost packets when resources may overflow. These characteristics are dependent both on the amount of load as well as how it varies in time, on the nature of the load in terms of its packet size distribution, its instantaneous and average rates, and its shape, for example its burstiness, and where the load is applied in the network and interplays with other loads.

Even where a load profile may be constant and regular in time, packet size and rate, and within the capacity of all links on the route, packet switching nodes will still cause their own form of delay variation termed switching jitter. This may occur due to internal timing variations that effect the absolute ordering of packets of a timing distribution service relative to other loading services (queuing effects), or because any load services and the timing distribution service have in general inter packet gaps that are not related in a regular way. In general, switching jitter and load induced packet jitter are not correlated, and load jitter is dominant. Furthermore, the amount of load or utilisation relative to capacity in general is slower changing than the delay variation distribution it induces. In general this highly statistical and unpredictable behaviour of the packet layer can severely impair a clock signal, since any variation in delay across the network interferes with the instantaneous frequency rate and the information that can be extracted from the time distribution service packets.

There are several known packet layer techniques for distributing time signals that try to overcome the statistical impairment. A first known technique is a differential technique that measures the source clock of interest relative to a reference that is commonly available to both the master and the slave. The difference between the source clock and reference is transmitted to the slave to reproduce the original frequency relative to the common reference. This is most useful where it is necessary to send an ad hoc frequency between two points, for example a customer's clock relative to a communications network clock. The technique avoids the statistical impairment but suffers from the need to have a common high quality reference, which to date has relied on the communications network clock disseminated at the physical layer in SDH networks. The best example of this technique is ITU-T I.363.1 ATM AAL-1 Synchronous Residual Time Stamp (SRTS) using the SDH clock as reference. Clearly, the technique, albeit using the packet layer, requires a physical layer clock or equivalent reference to operate.

A further known technique is Adaptive Clock Recovery (ACR) which relies on discerning the master's original clock frequency from packet arrival times, and/or timestamps the master has inserted into a packet stream. For simplicity this technique often relies on the master sending packets at a regular interval. This technique is therefore a feature usually supplementary to a constant bit rate communications service that the packet stream represents. Proprietary algorithms are used in commercial implementations of the slave device that invariably rely on Phase Locked Loops (PLLs) and filters to reduce the noise of the packet jitter induced by any network loads. The challenge for this technique is that jitter induced by a load with high transient changes of small amplitude (level) are very difficult to discriminate from the general switching jitter (noise)—a non-stationary distribution, as well as a load that changes only very slowly i.e. over a long time; the former can radically change the delay through the network upsetting the phase of the PLL, and the latter becomes increasingly difficult to filter at ever lower frequencies, which ultimately result in a varying frequency offset in the slave. Examples of this technique are ITU-T I.363.1 ATM AAL-1 ACR, and the Internet Engineering Task Force Circuit Emulation Services over IP (IETF CESoIP) or Structure Agnostic TDM over Packet (SAToP) Real-Time Protocol (RTP) Timestamp clock recovery.

A further known group of techniques are bidirectional phase offset techniques that attempt frequency synchronization simultaneously with phase and time-of-day or Coordinated Universal Time (UTC) synchronization. These techniques typically derive frequency from any phase synchronization, so the quality of phase synchronization determines the quality of frequency synchronization. Examples of this technique are standardised as IEEE1588 and IETF NTPv1 to NTPv4 the latter still under construction. These phase offset techniques use the packet network to send timestamp information in both directions between the master and slave, or rely on measurements of the roundtrip time of the bidirectional route between master and slave. All these techniques have to make the assumption that the delay in both directions of the route is equal, because there is a paradox that it is impossible to discern the delay in each direction separately without first synchronising the phase of the slave clock. The phase of the slave clock at any instant prior to synchronization is certainly arbitrary relative to the master, and is used to timestamp arrival and dispatch of packets at its own end. Similarly a measurement of the roundtrip time cannot apportion delay to each direction without knowledge of arrival time at the slave with reference to the master's clock, so the roundtrip time is simply halved. By assuming the delays of each direction are equal, the phase of the slave is set to be an appropriate correction for half the round trip delay after the master clock. However this still does not make the phase of the slave clock knowable at the master because the delay to the slave receiving this instruction remains unknown. Frequency is derived from phase under all conditions by differentiation; i.e. frequency is equal to the rate of phase change or drift. Corrections for phase offset result directly in frequency offsets therefore. Unfortunately, the delays of a packet network in different directions even for the same route are seldom equal, and for many networks the routes may differ in a physical sense in the directions master to slave and slave to master in terms of number of nodes, links and their distance. Moreover, the delay over the route in either direction can vary considerably and independently as load in each direction varies in the network. Even where steps are taken to detect all these situations, which cannot be mathematically exact but only heuristic, there will be a residual phase offset caused at the slave, or corrections continuously applied with concomitant failure of frequency synchronization. Elaborate algorithms are required to smooth out the packet switching jitter noise and variation of the distribution under load, but even constant loads will still cause constant phase offsets, and high transient loads can cause significant frequency offsets, or force the slave into a holdover mode that incurs its own drift by being decoupled from the master, by definition, at least for the duration of the disturbance.

Accordingly, there is a need for an alternative technique for achieving synchronization between a master and a slave.

SUMMARY OF THE INVENTION

A method is provided of achieving frequency synchronization between a first clock at a first node and a second clock at a second node of a packet-carrying communications network. The method provides, at the first node: measuring a property of packet transmission through the network between the first node and the second node; and sending the measurement of the property to the second node. The method further provides, at the second node: measuring the same property of packet transmission through the network between the first node and the second node; and, using the measurement of the property made at the first node and the measurement of the property made at the second node to synchronize the frequency of the second clock with respect to the first clock.

One feature of the invention is an ability to make a measurement at a first node of a property that a second node can also make independently, and these measurements can then be compared. In an advantageous embodiment, the first node is considered the master and the second node is considered the slave. If the property being measured is relatively independent of noise and disturbances between the times at which the master and slave make their measurements, then any difference in a comparison of the results communicated between the two can be assumed to be due to differences between the slave clock frequency relative to that of the master clock frequency. Where there is any such difference of a commonly available and independently measured property, the slave may in an iterative or feedback manner directly use that difference and any derivative of that difference or other mathematical or statistical variation based on it to slow down or speed up its own clock frequency which may be a corrected form of its local oscillator frequency until the difference between master and slave measurements is negligible on a regular basis. One or more such properties can be measured, and one or more instances of the same property can be measured, to increase further the accuracy by which the slave clock frequency can be made to track the master's clock frequency.

It is desirable that the property available to be measured by both master and slave is relatively independent of load variations in a packet network. This property can be measured to a high resolution by varying the sampling frequency at which measurements are made by the master and slave, by making several such measurements and averaging the results, by making the master and slave measurements as contemporaneous as possible, and/or by filtering the property's measurements and averaging or using other statistical techniques over time to achieve relative independence from any changing load and switching characteristics of the intervening packet network.

Advantageously, the property that is measured at the first node (master) and second node (slave) is a difference in transfer delay between two roundtrip paths between the first node and the second node via two different routes. By arranging for the two routes to share one of the uplink or downlink legs, the measured property is effectively a difference in transfer delay for a single direction, and this can simplify the measurements that need to be made at the second node. Other properties can be measured in addition to, or as an alternative to, transfer delay, such as delay variance. Alternatively, packets of different lengths can be sent along the same route, or different routes, and the difference in transfer delay for the two packet lengths can be measured as a property. Furthermore it is also suitable for either the first node or the second node to deliberately delay the transmission of a packet by a certain length of time before sending it on a single route of one down and one up link, in addition to a packet sent with a normal transmission time, to simulate the behaviour of two or more routes with different characteristics. This process can be repeated. A special case of this general method would be packets sent at regular intervals where any given packet may be considered to be a delayed version of the previous packet or any and all previous packets. This method may also be used where the first and second node use two or more routes to deliberately introduce a difference between the routes in the rare case where their behaviors would otherwise yield no measurable differences. It is additionally suitable for the purposes of this invention, independently or in addition to the above methods for either the first node or the second node to deliberately delay the transmission of a set of packets by a random or known pattern of transmission time variation before sending them on a single route of one down and one up link, instead of or in addition to a set of packets sent with normal transmission times, to simulate the behaviour of two or more routes with different characteristics, and/or to send such packets over two or more routes to overcome the rare eventually where these routes otherwise would have equal delay distribution characteristics, which may otherwise yield no measurable differences.

Further aspects of the invention provide a method which comprises the steps performed at the first node (e.g. master) and another method which comprises the steps performed at the second node (e.g. slave).

An advantage of this method is that, provided there is relatively constant communication between the master and slave, it is possible to use a cheaper, less accurate, oscillator than would ordinarily be required. This is due to the limited need for holdover correction techniques and any small drift between the oscillators being regularly and accurately corrected by the means of the invention. Alternatively, the invention allows an even higher accuracy to be achieved from a stable oscillator. High frequency accuracy is a key means for achieving high quality approximations for time-of-day and phase synchronization.

This invention allows high accuracy frequency synchronization independent of packet network impairments, which when combined with the possibility to use cheap oscillators, would suit applications like femtonodes (small numerous cheap wireless basestations) communicating over DSL broadband with the network. A femtonode typically may also require a 40 microsecond maximum phase offset for time-of-day. The accurate frequency synchronization can be used as a stable platform enhanced by techniques for deriving phase and time-of-day, assisting those latter processes to make sound approximations of the relative offset of the femtonode clock to a network reference. In an application such as WiMax, there is a requirement for a maximum phase and time-of-day error between a basestation and network reference of a mere 250 ns. WiMax has so far relied on Global Positioning System (GPS) receivers to achieve this kind of accuracy. However, this is deemed to add several hundred dollars ($500) to the cost of the basestation alone, as well as an ongoing operating expense to ensure antenna integrity and signal availability. The invention allows high accuracy synchronization and phase control when combined with high end oscillators such as an oven controlled crystal oscillator or better, which can boost the ability to improve approximations of the relative offset of the WiMax basestation clock to the network reference into the region of the accuracy demanded above.

The term "packet" is intended to encompass any identifiable group of transmitted data bits which are sent by a node and which can be recognised by the same node (e.g. in the case of roundtrip measurements) and/or another node (e.g. in the case of one-way measurements). This includes, for example, an identifiable group of line coded data bits.

Further aspects of the invention provide apparatus at each of the first node (e.g. master) and second node (e.g. slave) which are arranged to implement the steps of the respective methods at those nodes.

The functionality described here can be implemented in software, hardware or a combination of these. The invention can be implemented by means of hardware comprising several distinct elements, and by means of a suitably programmed computer. Accordingly, another aspect of the invention provides a machine readable medium comprising code which, when executed by a computer, performs any of the described methods. The software may be stored on an electronic memory device, hard disk, optical disk or any other machine-readable storage medium. The software may be delivered as a computer program product on a machine-readable carrier or it may be downloaded to the network node via a network connection.

BRIEF DESCRIPTION OF THE DRAWINGS

Embodiments of the invention will be described, by way of example only, with reference to the accompanying drawings in which:

FIG. 4 shows a second, simplified way of synchronizing clocks at a master and slave by measuring roundtrip transfer delays at the master and measuring time of arrival of packets at the slave;

FIG. 4A shows an alternative form of FIG. 4 in which roundtrip transfer delays are measured at the slave and time of arrival of packets is measured at the master;

DESCRIPTION OF PREFERRED EMBODIMENTS

Figure 1:
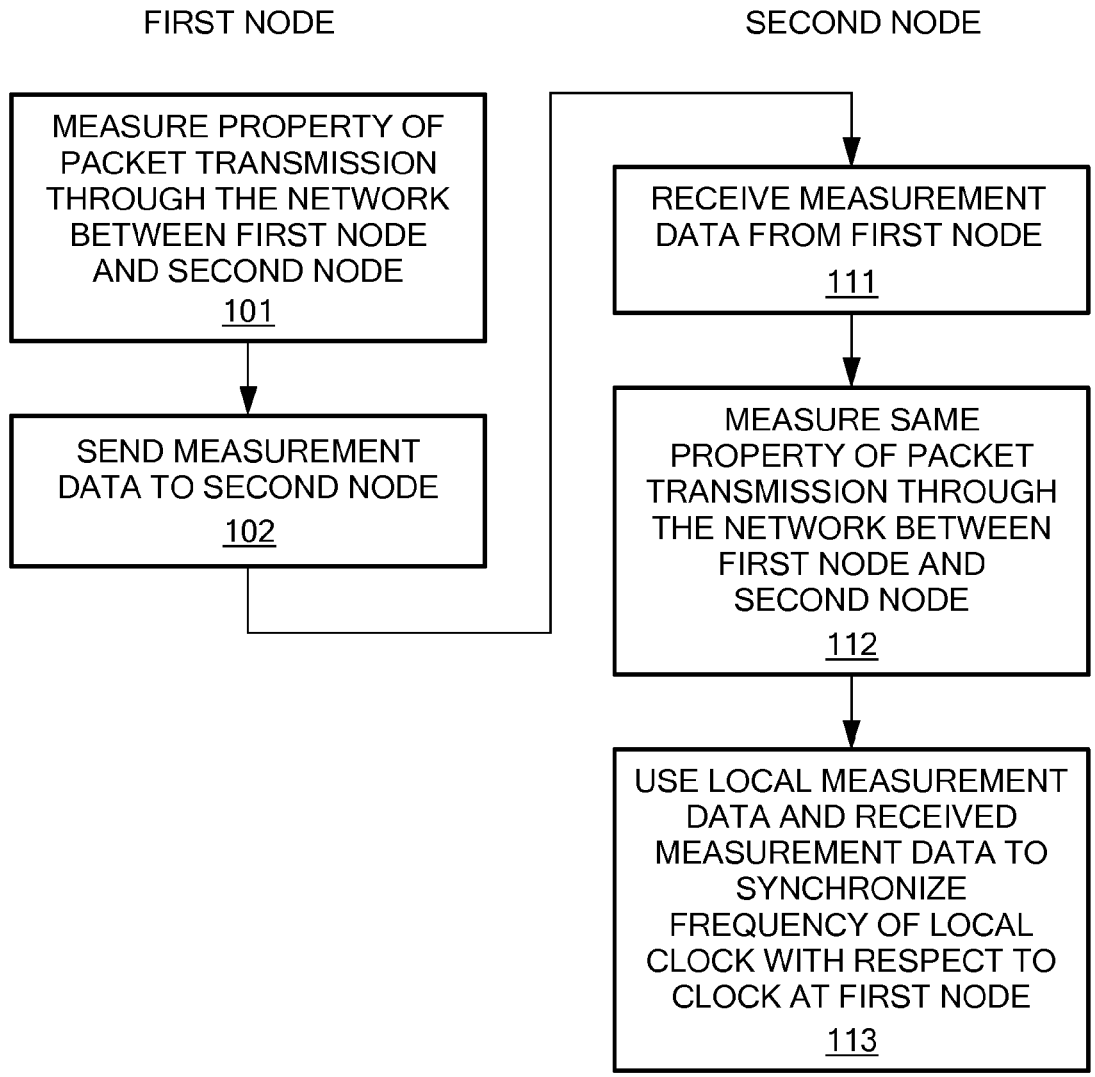
FIG. 1 shows an overview of a method to synchronize a clock at a slave node with a clock at a master node.

FIG. 1 shows a flow chart of steps performed at two nodes of a network. Each node has a clock which is used by that node. Steps 101, 102 are performed at a first node of the network. At step 101 the first node measures a property of packet transmission through the network between the first node and the second node. As an example, the property can be round trip transfer delay, although other properties are described below. At step 102 measurement data is sent to the second node. Steps 111-113 are performed at the second node. At step 111 measurement data is received from the first node. At step 112 the second node measures the same property of packet transmission through the network between the first node and the second node. The local measurement data, and the received measurement data, are used to help synchronize the frequency of the clock at the second node with respect to the clock at the first node.

Figure 2:
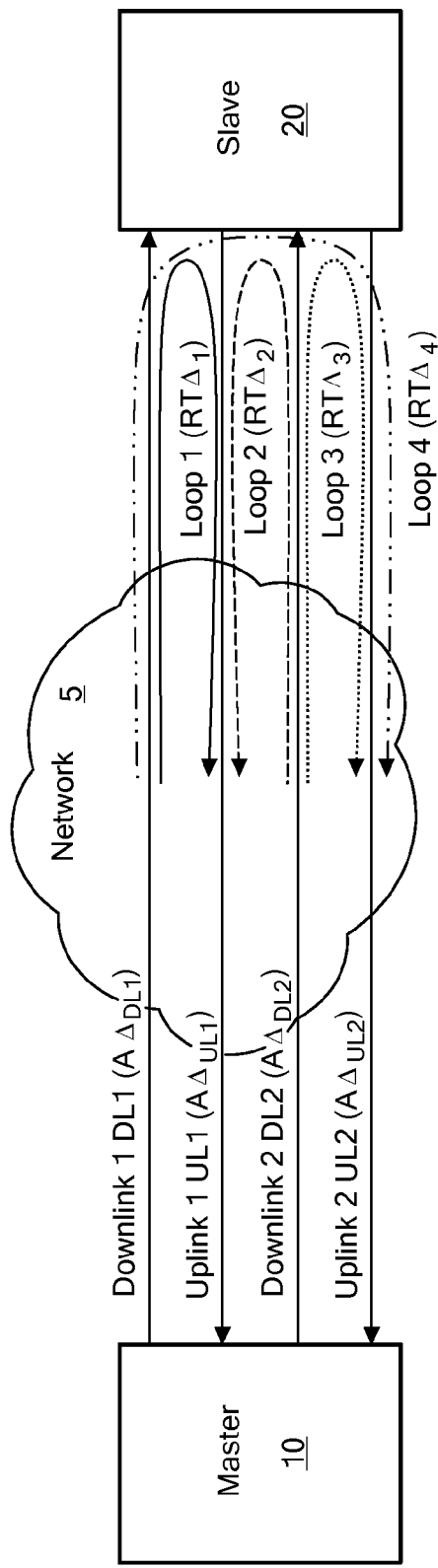
FIG. 2 shows a set of roundtrip measurements that a node can make using a set of links.

FIG. 2 shows an example communications network 5 with a master node 10 and a slave node 20. The network 5 can be a wireline network, a wireless network, or a network which combines both wireline and wireless technologies. The overall network 5 can include a plurality of different networks. Two downlink paths DL1, DL2 and two uplink paths UL1, UL2 are shown between the master 10 and slave 20. This combination of downlink and uplink paths gives four possible round trip routes (loops): Loop 1 comprises DL1 and UL1; Loop 2 comprises DL2 and UL1; Loop 3 comprises DL2 and UL2; and Loop 4 comprises DL1 and UL2. Route 1 and 3 are disjoint, as indeed are routes 2 and 4; otherwise other pairings have one link direction in common. A first property which can be measured at the Master 10 and Slave 20, and used to synchronize clocks, is a difference in transfer delay (in a common direction) for different routes between the master node and the slave node. As will be described more fully below, it is possible to measure, at the master, a difference in transfer delay for a first loop and a second loop, and to perform a similar set of measurements at the slave. Any difference between the two measurements can be attributed to the frequency of the clock at the slave, and used to drive the slave's clock into synchronization with the master. It can be seen that for two routes there would be one difference in each direction, for three routes there would be three differences in each direction (pairwise) and so on.

Using one clock (e.g. at the master) to perform roundtrip measurements yields four equations in four unknowns:

$$RT\Delta 1 = A\Delta DL1 + A\Delta UL1$$

$$RT\Delta 2 = A\Delta DL2 + A\Delta UL1$$

$$RT\Delta 3 = A\Delta DL2 + A\Delta UL2$$

$$RT\Delta 4 = A\Delta DL1 + A\Delta UL2$$

where A denotes an actual property—in this example transfer delay, and RT the roundtrip property, again for example transfer delay.

Unfortunately, these equations are not linearly independent, since $RT\Delta 1 - RT\Delta 2 + RT\Delta 3 = RT\Delta 4$, so $A\Delta DLX$ and $A\Delta ULX$ cannot be determined precisely. However, one can determine the actual property difference between the links of each direction:

$$A\Delta DL1 - A\Delta DL2 = RT\Delta 1 - RT\Delta 2 = RT\Delta 4 - RT\Delta 3$$

$$A\Delta UL1 - A\Delta UL2 = RT\Delta 1 - RT\Delta 4 = RT\Delta 2 - RT\Delta 3$$

The relationship of actual property (e.g. network transfer delay) to measured property (e.g. network transfer delay) and phase $\Phi$ between Master and Slave clocks, is given by:

$$A\Delta ms = M\Delta ms - \Phi$$

$$A\Delta sm = M\Delta sm + \Phi$$

where $A\Delta^{}$ denotes an actual difference and $M\Delta^{}$ denotes a measured difference, as measured by one of the nodes. MS signifies the master to slave direction and SM vice versa. Applying this to two routes:

$$A\Delta DL1 = M\Delta DL1 - \Phi 1$$

$$A\Delta DL2 = M\Delta DL2 - \Phi 2$$

$$A\Delta UL1 = M\Delta UL1 + \Phi 3$$

$$A\Delta UL2 = M\Delta UL2 + \Phi 4$$

where $\Phi 1$, $\Phi 2$, $\Phi 3$, and $\Phi 4$ are distinct phases of the slave clock relative to the master to account for the phase drift of the slave clock which will occur in general between the times that the measurements can be made The difference between the first pair and similarly the second pair respectively is:

$$A\Delta DL1 - A\Delta DL2 = M\Delta DL1 - M\Delta DL2 - (\Phi 1 - \Phi 2)$$
$$= RT\Delta 1 - RT\Delta 2$$
$$= RT\Delta 4 - RT\Delta 3 \text{ and:}$$
$$A\Delta UL1 - A\Delta UL2 = M\Delta UL1 - M\Delta UL2 + (\Phi 3 - \Phi 4)$$
$$= RT\Delta 1 - RT\Delta 4$$
$$= RT\Delta 2 - RT\Delta 3$$

where ($\Phi 1$-$\Phi 2$) and ($\Phi 3$-$\Phi 4$) represent the phase drift or frequency offset between the slave and master clocks in the interval being measured. If the roundtrip measurements or differences are exchanged between the master and slave (one way, or both ways), the slave (and master) can calculate the phase drift of it's—the slave's—local clock with respect to the master clock from its own measurements of the same property. So, where for example the property is a transfer delay measurement made over each of two roundtrip loops, and the two loops have the uplink leg in common, the measured difference in transfer delay will represent the difference in the downlink legs DL1, DL2 of the respective loops. And where the property is for example a transfer delay measurement made over each of two roundtrip loops, and the two loops have the downlink leg in common, the measured difference in transfer delay will represent the difference in the uplink legs UL1, UL2 of the respective loops. Alternatively, a property (e.g. transfer delay) measurement can be made over each of two roundtrip loops which are entirely separate, such as loop 1 and loop 3, and the difference between these roundtrip property (e.g. transfer delay) measurements can be derived. In this latter situation both the master and slave would be measuring the difference in the roundtrip property with the relationship between the two being represented as:

Master: $RT\Delta 1 - RT\Delta 3$

Slave: $RT\Delta 1 - RT\Delta 3 + (\Phi 1 - \Phi 3)$

A first embodiment of the method for measuring roundtrip transfer delay that is generally applicable to disjoint routes as well as routes with one direction in common will now be described with reference to FIG. 3.

Steps Performed at Master Node, 10
 (1) measure roundtrip transfer delay for a first route (e.g. Loop 1);
 (2) measure roundtrip transfer delay for a second route (e.g. Loop 2, as defined in FIG. 3);
 (3) determine difference value between the measurements obtained at step (1) and step (2);
 (4) send the difference value calculated at step (3) to the slave node 20.

Steps Performed at Slave Node, 20
 (5) receive difference value from Master node;
 (6) measure roundtrip transfer delay for a first route (e.g. Loop 1);
 (7) measure roundtrip transfer delay for a second route (e.g. Loop 2);
 (8) determine difference value between the measurements obtained at step (6) and step (7);
 (9) compare the difference calculated at step (8) and the difference value received at step (5);
 (10) use result of step (9) to correct slave clock. Any discrepancy in the comparison of difference values at step (9) is deemed to be directly due to a phase drift equivalent to a frequency offset between the slave clock and the master clock in the time intervals over which the measurements have been taken.

Although not explicitly described above, as part of the roundtrip measurements made at step (1) and step (2), the slave 20 receives a packet from the master 10 and resends the packet to the master. Similarly, as part of the roundtrip measurements made at step (6) and step (7), the master 10 receives a packet from the slave 20 and resends the packet to the slave. It is preferable that, in each case, the resending is performed as quickly and as uniformly as possible.

This method, or a sub-set of the steps of the method, can be performed iteratively with the aim of minimising any difference in frequency between the slave clock and the master clock. The steps set out above should not be interpreted as strictly sequential in time, as many of the measurements can be made contemporaneously and benefit from doing so. The slave clock can be corrected at step (9) on the basis of a single iteration of the method, or alternatively it may be preferable to monitor the results obtained from a plurality of iterations of the method and to apply a correction to the slave clock if the results over the plurality of iterations confirm that a particular correction should be made to the slave clock. As an example, a requirement can be set that the results of N (e.g. 10) successive iterations of the method must indicate the same direction of change (i.e. direction 1=increase frequency, direction 2=decrease frequency) before the slave clock frequency is corrected. It will be appreciated that any other suitable requirements can be set. Various control techniques can be used to ensure that the slave clock is quickly brought into synchronization with the master clock.

Alternatives for this method are:
 packets sent at steps (1), (2) each carry a timestamp of the Master's clock and the Master uses the timestamp in a received packet, and a time of arrival at the Master, to measure the roundtrip transfer delay. Alternatively, the Master can include an identifier in the packet and log the time of sending the packet, for use in calculating the transfer delay when the packet is subsequently received. The Slave can use timestamps or logs in the same manner as the Master.
 make a measurement of roundtrip transfer delay for other routes (e.g. Loop 3, Loop 4) as an optional step 2A, and determine other difference values between pairs of routes;
 step 4 can send other statistics about packet transmission which the Master has acquired. The Slave can also acquire similar statistics and the two sets can be compared at steps (8) and (9).
 filter, average, or statistically process, multiple difference values (for the same pair of routes) obtained at step (3), or multiple transfer delay measurements (for the same pair of routes) obtained at steps (1), (2) and send the processed value at step (4). This has the effect of removing packet switching jitter (relatively high frequency) to leave only load change-induced delay changes (relatively low frequency).
 filter, average, or statistically process, multiple difference values obtained at step (8), or multiple transfer delay measurements obtained at steps (6), (7) and use the processed value at step (9).
 the Master sends raw measurements of individual routes obtained at steps (1), (2) without determining a difference value and the Slave derives the difference value itself.

The master 10 can send the difference values, or raw results, to the slave using the packet network which is being monitored, or by any other means of communication. The master 10 may also apply a filtering process, an averaging process or any other statistical method to process the results before communicating them at an appropriate interval.

The slave can use the same technique of measuring roundtrip delays on the same routes and/or inter-route delay measurements taken pairwise up one route and down another, to achieve exactly the same difference measurements relative to the slave's own clock. The slave may also apply a filtering process, and averaging process or any other statistical method to process its results and if necessary the results from the master. The statistical method can be the same method as that used by the master or a different method.

The slave then compares the pairwise differences it measured as well as any results of statistical processing to the respective pairwise differences measured and/or statistical results computed and communicated by the master.

Figure 3:
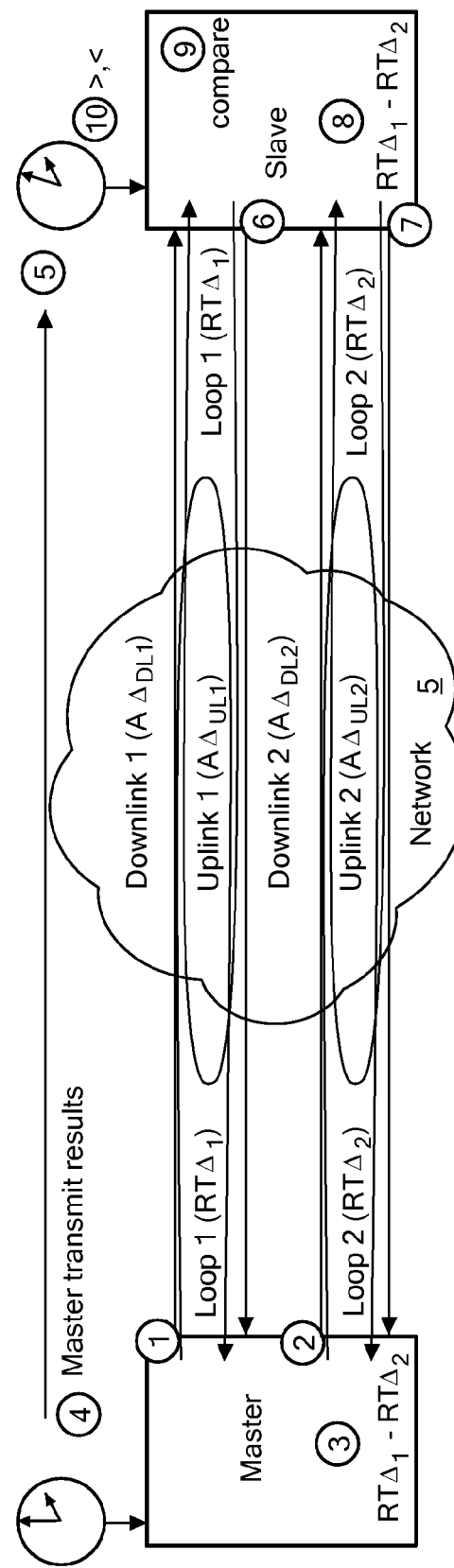
FIG. 3 shows a first way of synchronizing clocks at a master and slave by measuring roundtrip transfer delays at the master and at the slave.

Although FIGS. 2 and 3 only show one slave node it will be appreciated that this method can be repeated for each slave node in the network.

A second, simplified, embodiment of the method for measuring transfer delay on routes with one direction in common will now be described with reference to FIG. 4.

(1) Master measures roundtrip transfer delay for a packet sent via a first route (Loop 1);
(2) Slave records time of arrival of the packet using it's own clock;
(3) Master measures roundtrip transfer delay for a packet sent via a second route (Loop 2);
(4) Slave records time of arrival of the packet using it's own clock;
(5) Master determines difference value between the measurements obtained at step (1) and step (3);
(6) Slave determines difference value between the times recorded at step (2) and step (4);
(7) Master sends the difference value calculated at step (5) to Slave node;
(8) Slave receives the difference value sent at step (7);
(9) Slave compares the difference calculated at step (6) and the difference value received at step (8);
(10) Slave uses result of step (9) to correct slave clock. Any discrepancy in the comparison of difference values at step (9) is deemed to be directly due to a phase drift equivalent to a frequency offset between the slave clock and the master clock in the time intervals over which the measurements have been taken.

It should be noted that this embodiment is simplified because it does not require the Slave 20 to make any roundtrip transfer delay measurements. Instead, the Slave is only required to record time of arrival of two identifiable packets. The packets can carry any suitable element within their header or payload which indicates to the Slave that the packets are being sent for the purpose of frequency synchronization. The Slave recognizes the two packets and records a time of arrival for each of the packets at steps (2, 4). One feature which makes this simplified embodiment possible is that Loop 1 and Loop 2 share the same uplink leg and the difference in transfer delay calculated by the Master at step (5), and sent to the Slave at step (7), represents the difference in transfer times incurred by downlink legs DL1, DL2. This is the same quantity that the Slave measures at step (6), since the difference in arrival time is due to the different downlink legs DL1, DL2. This embodiment simplifies the amount of processing at the slave node 20, reduces the amount of network traffic necessary to perform the method (since packets are only sent by the master), and also has the potential benefit of less dependence on noise and disturbance in a packet network.

Alternatives for this method are:
- packets sent at steps (1), (3) each carry a timestamp of the Master's clock and the Master uses the timestamp, and a time of arrival at the Master, to measure the roundtrip transfer delay. Alternatively, the Master can include an identifier in the packet and log the time of sending the packet, for use in calculating the transfer delay.
- Master can send a first packet for the purpose of measuring roundtrip transfer delay at step (1) and a second packet for the purpose of allowing the Slave to record the time of arrival.
- Packets sent at step (1) and step (3) are sent at the same time (or as near to same time as possible), or with an offset which is known by the Slave, or which is communicated to the Slave.
- Statistics can also be acquired by the Master and Slave and compared.
- Master makes a measurement of roundtrip transfer delay for other routes (e.g. Loop 3, Loop 4), and determines other difference values between pairs of routes;
- filter, average, or statistically process, multiple difference values.
- in addition the roles of the master and slave are reversed in the steps (1) to (6) above, such that in step (7) the master may communicate results obtained for the upstream direction for further processing by the slave in steps (9) and (10).
- At step (2) and step (4) the Slave can reoriginate a received packet, hold on to it for a recorded short time, or immediately loop it back to the Master. The slave may use the record of the short time it has held packets, which may in practical implementations vary from packet to packet, to obtain more accurate calculation of the measured downstream delay differences in comparison with that which the master measures, by ideally isolating only the upstream delay from its calculation. Where the roles are reversed between Master and Slave, then the Master may adopt the same method.

The Master can send the two packets at steps 1 and 3 simultaneously, contemporaneously, or separated in time preferably by an amount that remains insignificant relative to any changing load characteristics of the network. The slave determines the arrival times for each packet using the slave's own clock, which may be out of phase with the master clock. The measured delay on each route is therefore the difference between the arrival time on the slave's clock and the master's timestamp, which is the actual delay in time through the network plus an unknown relative phase offset between the master and slave clocks. This embodiment only requires the slave to determine the difference in delays between the pairwise downward directions of the two routes, and not the absolute transfer delay. In taking the difference between the above measurements, any constant component of phase offset of the slave's clock relative to the master's clock is cancelled out. As before the slave then compares the pairwise differences it measured as well as any results of statistical processing to the respective pairwise differences measured and/or statistical results computed and communicated by the master. Any discrepancy in this comparison of results is deemed to be directly due to a non-constant component of phase i.e. the phase drift, equivalent to a frequency offset between the slave clock and the master clock in the intervals over which the results represent. Iteratively and/or in a feedback manner applying this means of comparison of the results of one or more instances of a common property available to the master and slave, independently measuring the delay differences between routes between them taken pairwise, the slave may adjust is oscillator frequency accordingly such that the comparison yields negligible difference on a regular basis.

FIG. 4A shows an alternative form of FIG. 4. This operates in a very similar manner to FIG. 4 in that one node sends two packets over roundtrip paths with one leg in common, and the other node records time of arrival of the two packets. Whereas in FIG. 4 it was the Master that sends packets over round trip paths, in FIG. 4A it is the Slave that sends packets over roundtrip paths:

(1) Slave measures roundtrip transfer delay for a packet sent via a first route (Loop 1);
(2) Master records time of arrival of the packet using it's own clock;
(3) Slave measures roundtrip transfer delay for a packet sent via a second route (Loop 2);
(4) Master records time of arrival of the packet using it's own clock;

(5) Slave determines difference value between the measurements obtained at step (1) and step (3);
(6) Master determines difference value between the times recorded at step (2) and step (4);
(7) Master sends the difference value calculated at step (5) to Slave node;
(8) Slave receives the difference value sent at step (7);
(9) Slave compares the difference calculated at step (5) and the difference value received at step (8);
(10) Slave uses result of step (9) to correct slave clock. Any discrepancy in the comparison of difference values at step (9) is deemed to be directly due to a phase drift equivalent to a frequency offset between the slave clock and the master clock in the time intervals over which the measurements have been taken.

FIGS. 4 and 4A show an advantageous scheme where time of arrival is recorded for the packets which have been sent at steps (1) and (3) for the purpose of measuring roundtrip transfer delay. This minimises the number of sent packets and ensures that both nodes are measuring the same property for the same packet. In another possible scheme, separate packets are sent for the purposes of measuring roundtrip transfer delay and for recording time of arrival. The packets sent for the purposes of recording time of arrival are sent via the same routes as the packets sent for the purposes of measuring roundtrip transfer delay, although they only need to be sent in one direction.

Figure 5:
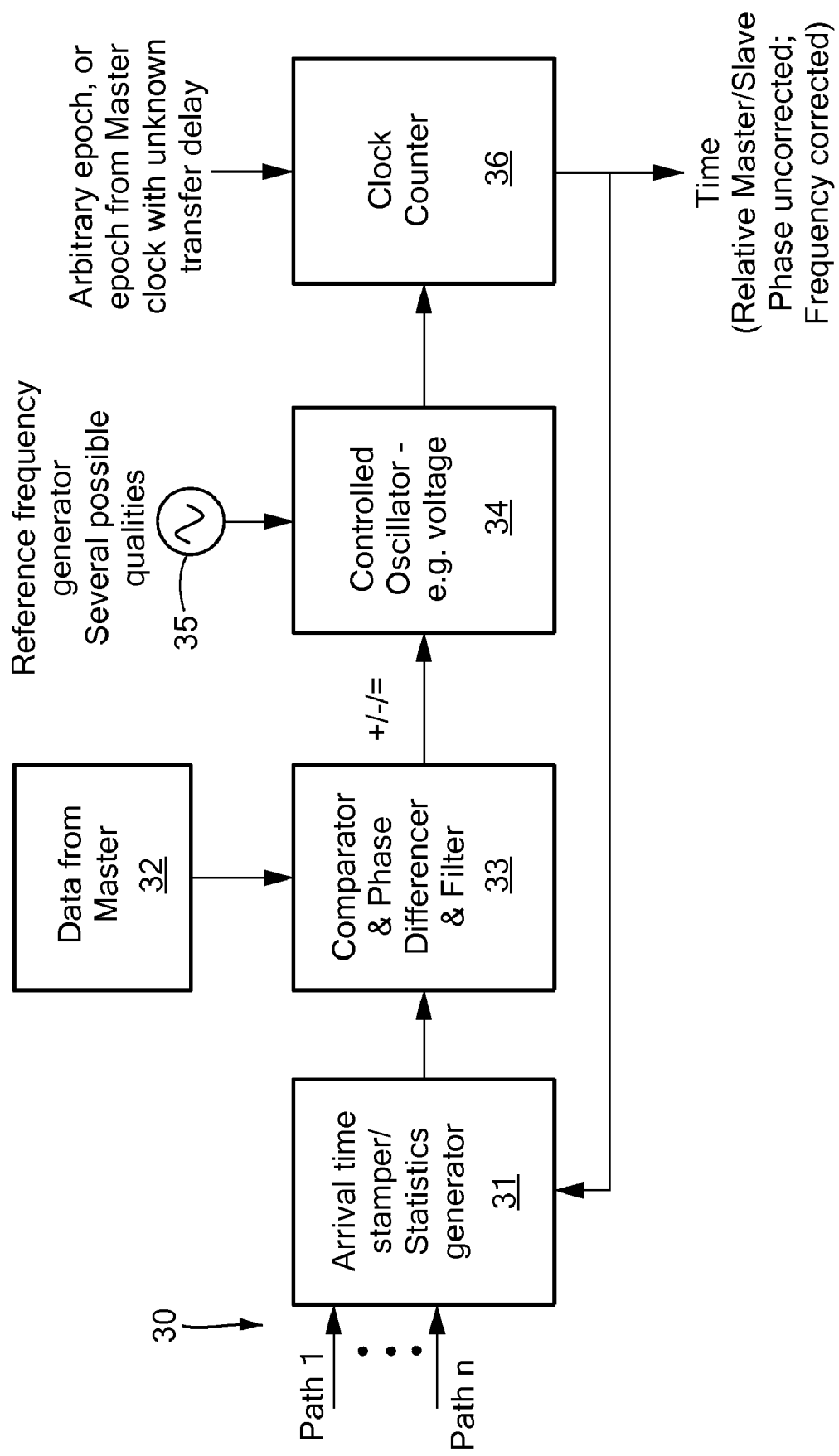
FIG. 5 shows apparatus at a slave node to implement the scheme shown in FIGS. 3-4A.

FIG. 5 shows apparatus at a slave node 20 for performing the method described above. Packets are received at input ports 30 of the slave node and a module 31 records a time stamp for each packet that is identified as being used for frequency synchronization. The arriving packets are received via different paths, such as the downlink path DL1 and downlink path DL2 shown in FIG. 4 or 3. For example, where the property being measured is a transfer delay, a transfer delay difference is calculated for pairs of received packets. Store 32 stores data received from the Master node 10, such as transfer delay difference results and other statistics. Module 33 compares the locally generated data from module 31 with the data received from the Master to determine whether a correction is required to the controlled oscillator 34, which serves as the local clock. Module 33 may apply filtering and other statistical processes to the results of the comparison to stabilise and determine the behaviour of the overall feedback loop. Clock counter 36 advances at a rate determined by the output of the controlled oscillator 34. An output of the clock counter is fed to module 31 and used to timestamp the arriving packets.

Figure 6:
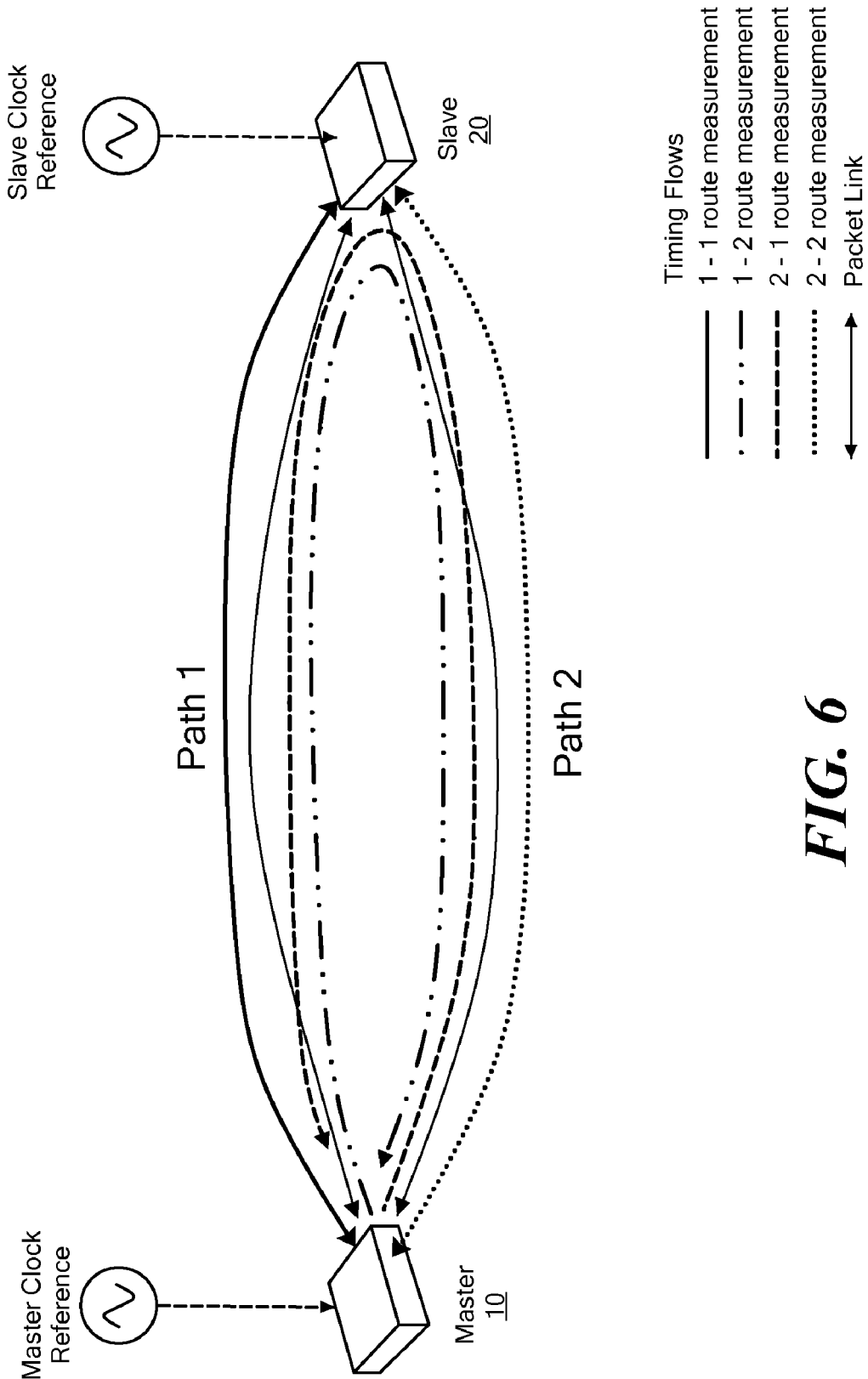
FIG. 6 shows how two fully independent routes may be minimally configured and the respective roundtrip measurements that can be made by a master.

The performance of each of the above embodiments improves with an increase in the number of routes for which roundtrip measurements are made. A minimum of two routes are required to determine a single delay difference value but, as shown in FIG. 2, the method can use additional routes which are distinct by virtue of combining an uplink of one path with a downlink of the same or another path. In general, for accuracy the difference between the routes of a pair should be as large as possible and any additional route pairs should be chosen such that each route pair's behaviour is independent and noise and disturbances are not fully correlated with those of other pairs. These properties may be achieved, for example, by ensuring that the routes are physically diverse, at least in part, so that transfer delay and/or load and switching characteristics of the network between master and slave will differ on each route. It is also necessary that the master and slave can ensure which route is being used when sending a packet in either direction. Each route would ideally also be bidirectional to offer the opportunity to determine measurements for each direction through the same links and nodes. Although this requirement is not strictly required for frequency synchronization it can be used for the further purpose of deriving phase synchronization. The route attributes described can most readily be provided in an Ethernet network that uses Provider Backbone Bridging-Traffic Engineering (PBT/PBB-TE) technology, although other technologies such as Asynchronous Transfer Mode (ATM), IP, Multi-Protocol Label Switching (MPLS) etc. that have these attributes can be used.

Where two routes are being used, one of the routes can be the protection path of the other normally active route at the packet layer; while an ordinary service may restrict its use to the active route alone, both routes could be used simultaneously for the purposes of this invention. The routes (of a disjoint pair, or the non-common direction of a pair of routes with a common direction) may be entirely physically diverse, or only in part, at least differing in one link anywhere along the route, preferentially differing by several links and/or nodes up to the full length of the routes. FIGS. 6-13 show a range of possible configurations for the paths FIG. 6 shows two entirely separate paths between master 10 and slave 20, i.e. the first path does not share any intermediate nodes, or links, with the second path. In this example, each path is a bi-directional path and there are four possible roundtrip measurements of transfer delay that can be made; these have previously been described with respect to FIG. 2. In the key to FIG. 6, "1-1" represents a roundtrip using the downlink and uplink legs of Path 1, "1-2" represents a roundtrip using the downlink leg of Path 1 and the uplink leg of Path 2, and so on. In order that there is a measurable property differential between different loop measurements, the first path should differ in some way from the second path, such as by having any of a different physical length, a different number of intermediate nodes, a different load etc.

Figure 7:
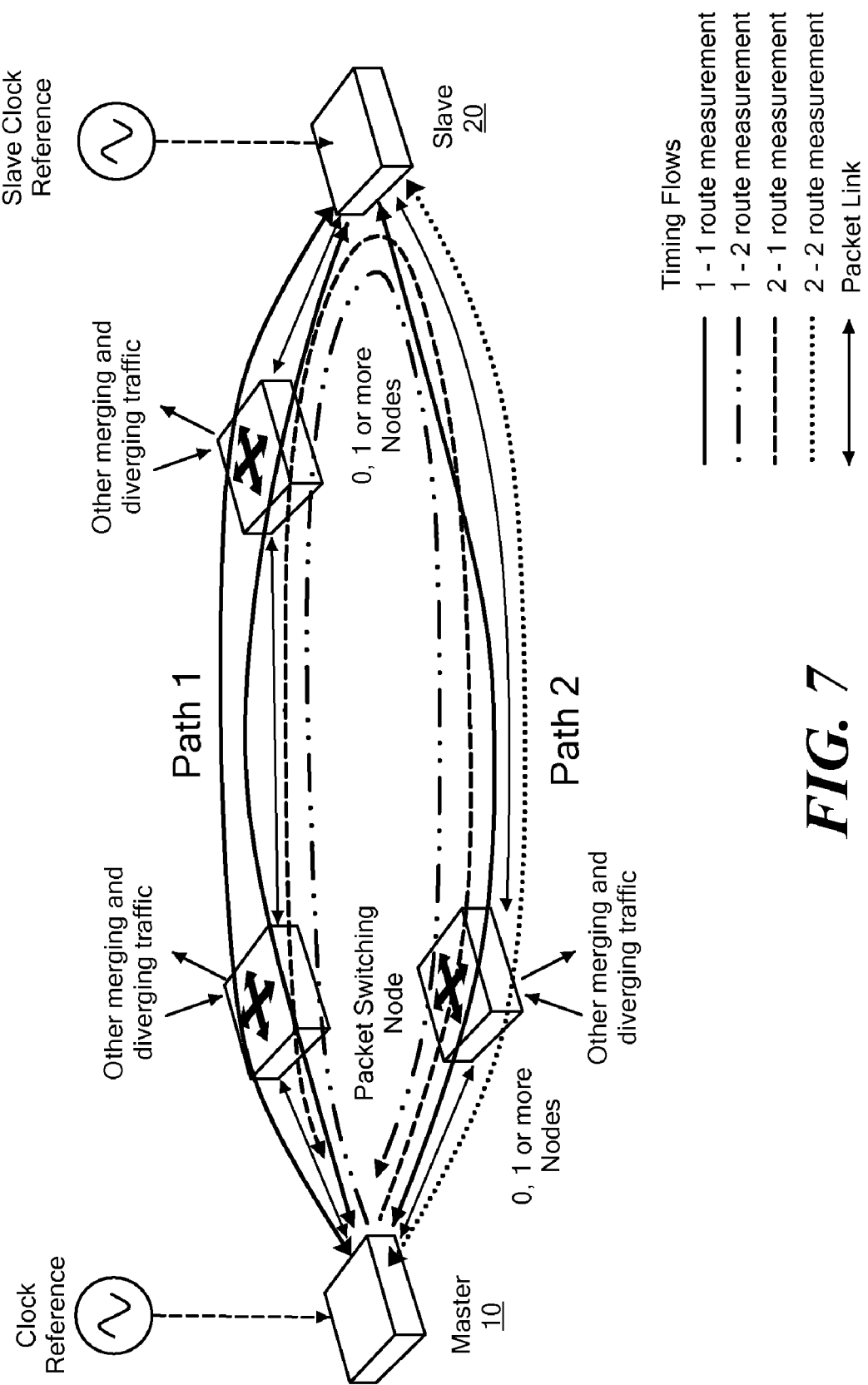
FIG. 7 demonstrates how two fully independent routes may be configured in a practical packet network and the respective roundtrip measurements that can be made by a master.

FIG. 7 also shows two entirely separate paths between master 10 and slave 20. It can be seen that the first path has a different number of intermediate packet switching nodes compared to the second path. Each intermediate node is an ingress/egress point for other traffic, which will introduce a transfer delay for a packet sent along that path.

Figure 8:
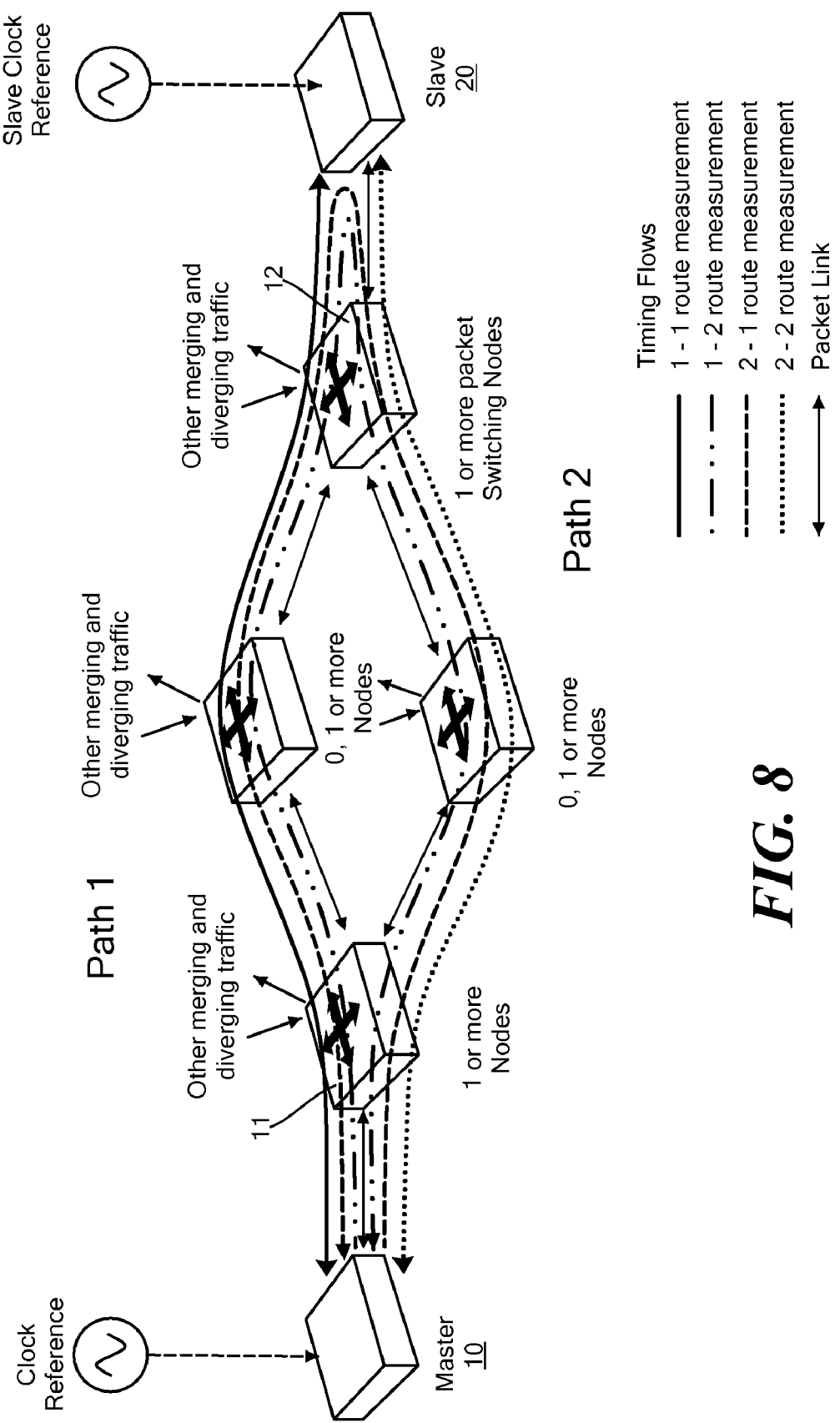
FIGS. 8 to 10 show examples of how two partially independent paths may be configured in a practical packet network and the respective roundtrip measurements that can be made by a master.
Figure 9:
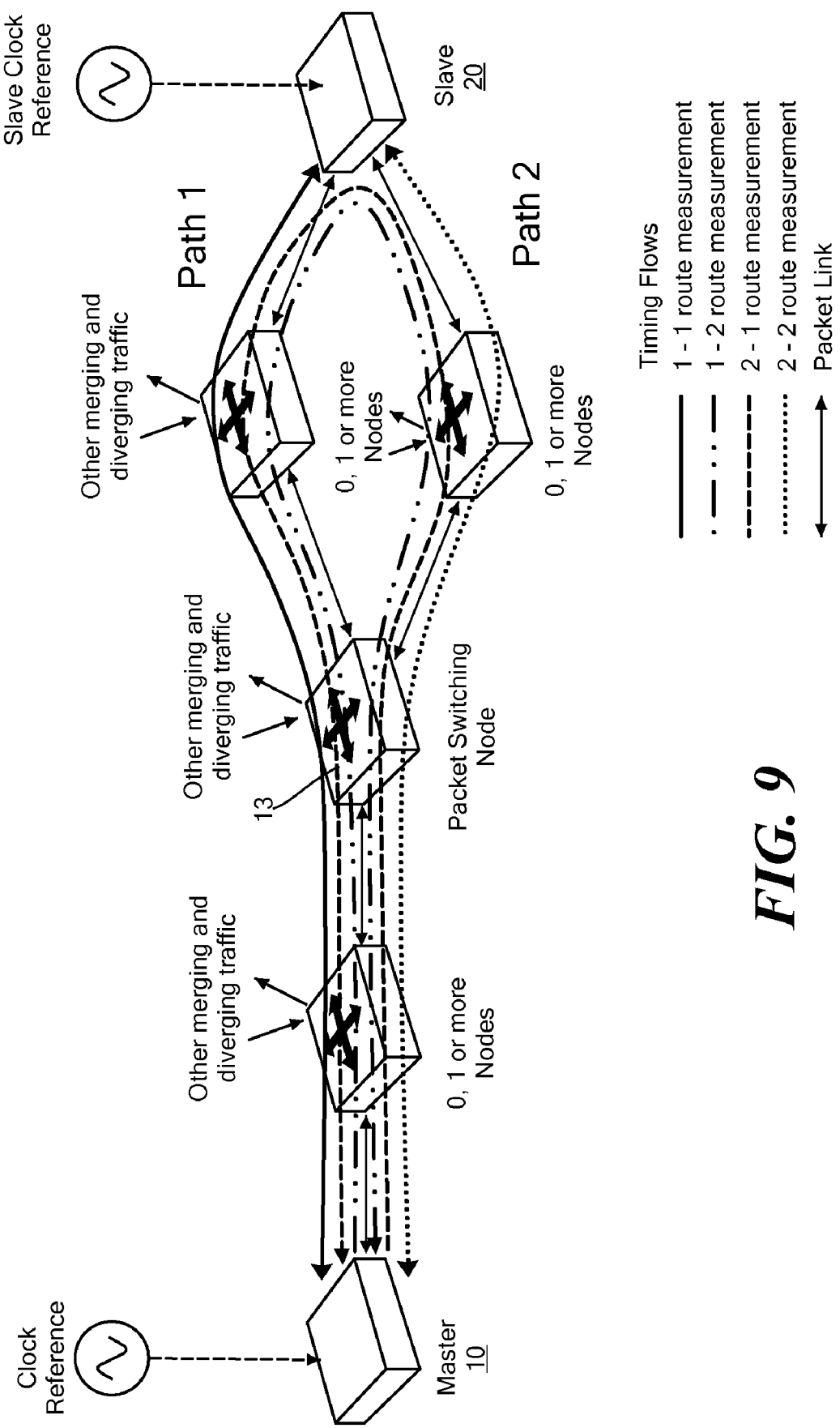
Figure 10:
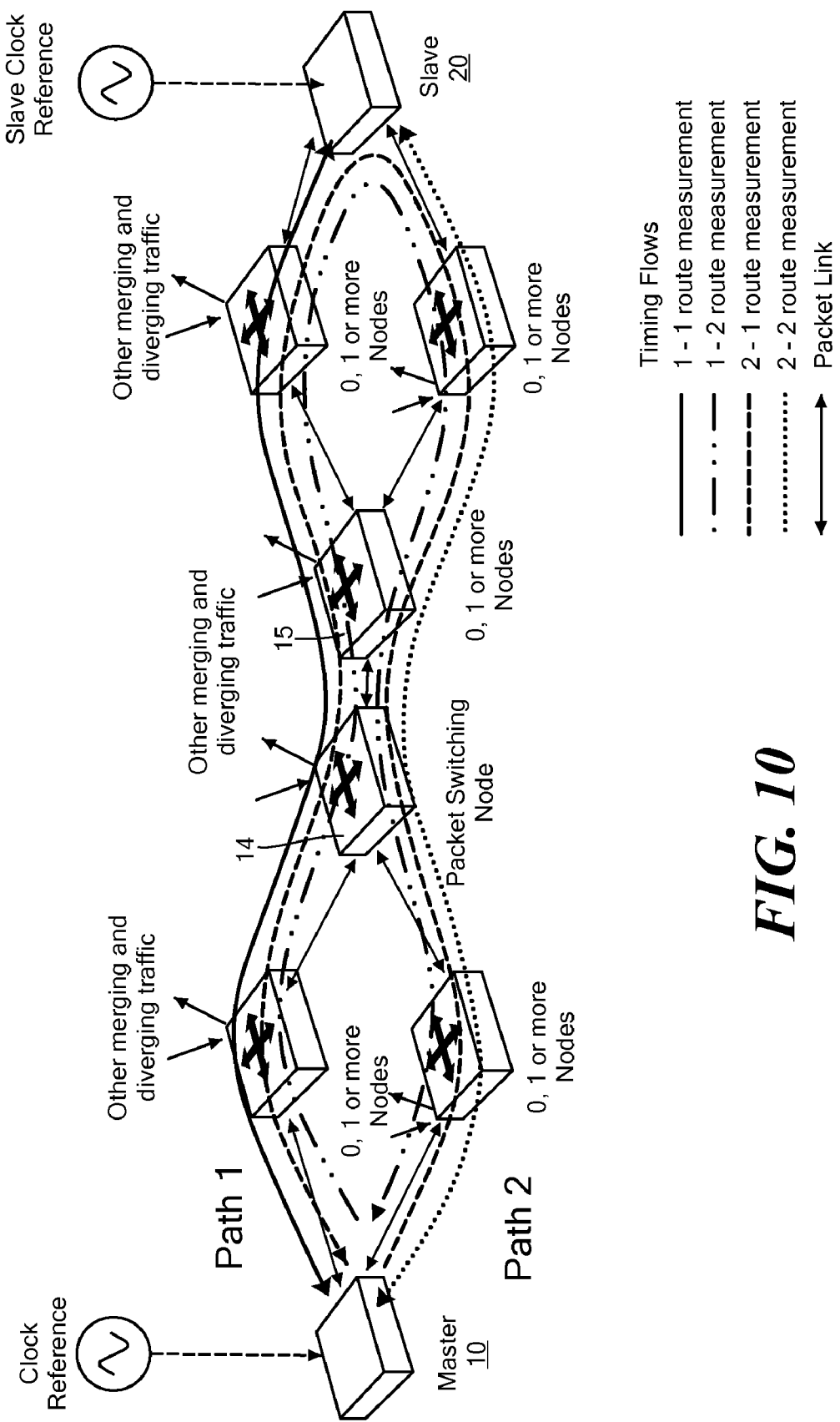

FIG. 8 shows two partially independent paths. Path 1 and Path 2 share the links between master 10 and node 11, and between node 12 and slave 20, but follow different paths between nodes 11 and 12. As for FIGS. 6 and 7, the portion of Path 1 and Path 2 between nodes 11 and 12 should preferably differ in any of length, number of nodes, load etc. so that each path has a different transfer delay. The common portion of Path 1 and Path 2 can occur anywhere in the network. FIG. 9 shows another example of partially independent paths, with Path 1 and Path 2 sharing the same set of links between master 10 and node 13, but following different paths between node 13 and slave 20. FIG. 10 shows Path 1 and Path 2 sharing the same set of links between intermediate nodes 14 and 15, but following different paths between master 10 and node 14, and between node 15 and slave 20.

Figure 11:
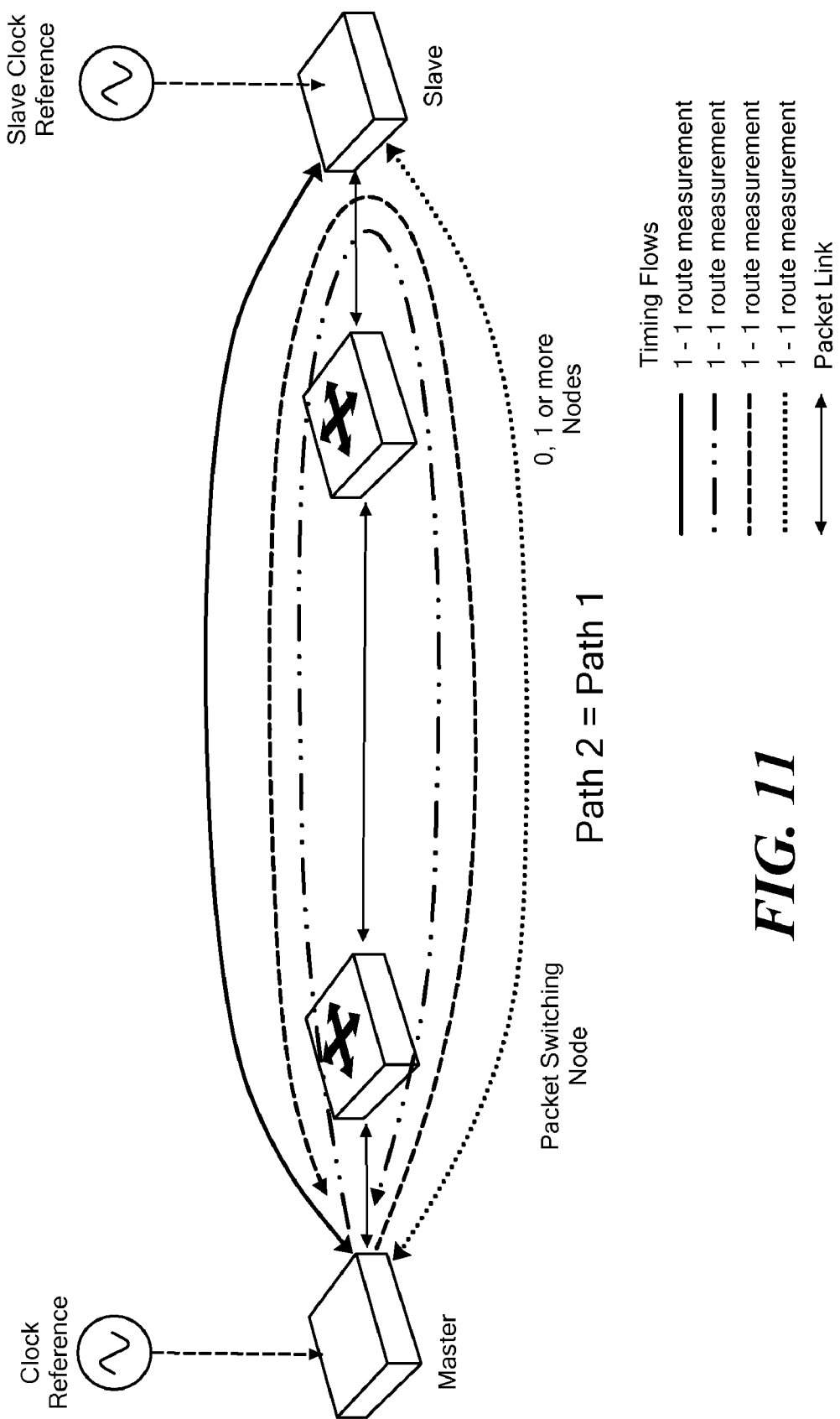
FIG. 11 shows how a network failure may result in the two formerly independent routes becoming coincident.

FIG. 11 shows the effect of a link or node failure on one of the two previously available paths. It is no longer possible to measure a difference between routes under these circumstances. Any failure of one or more routes, without further protection, will result in a reduction in the number of pairwise differences calculable. In general this may result in a drop in accuracy and frequency stability, but one can design the degree of redundancy to suit the application. In the extreme case (shown in FIG. 11) where only one route remains, no differential in the measured property may be calculable. The fallback position, should this occur, is to use either existing methods of frequency and phase distribution to counteract drift in the slave, or those methods in this invention only requiring a single route, such as the use of deliberately constant, random and or varied delayed transmission of a set of packets with or with in addition a normal set of packets, and or the transmission of packets of different lengths. Nonetheless, where the method relies more straightforwardly on a measured property differential e.g. transfer delay or delay variance, it is preferable that suitable route protection continues to ensure at least two routes remain under as many failure conditions as possible, and those routes continue to meet the criterion of at least one link difference. A protection switch of any route (at the physical and/or packet layers) in general will change the transfer delay and load profile of that route. Since the phase drift computation is a "difference of differences", provided the respective differences DL1–DL2 measured by the master and slave are compared (differenced), then any transfer delay change is of no matter, for example a longer route being used for one or more of the available routes, and similarly load changes do not matter. Alternatively, filtering in the slave can remove anomalous measurements that may overlap the duration of the switchover and stabilisation of the route. For phase measurements (as opposed to frequency) it is important to recognise the protection switch—this is dealt with under phased derivation techniques later.

Figure 12:
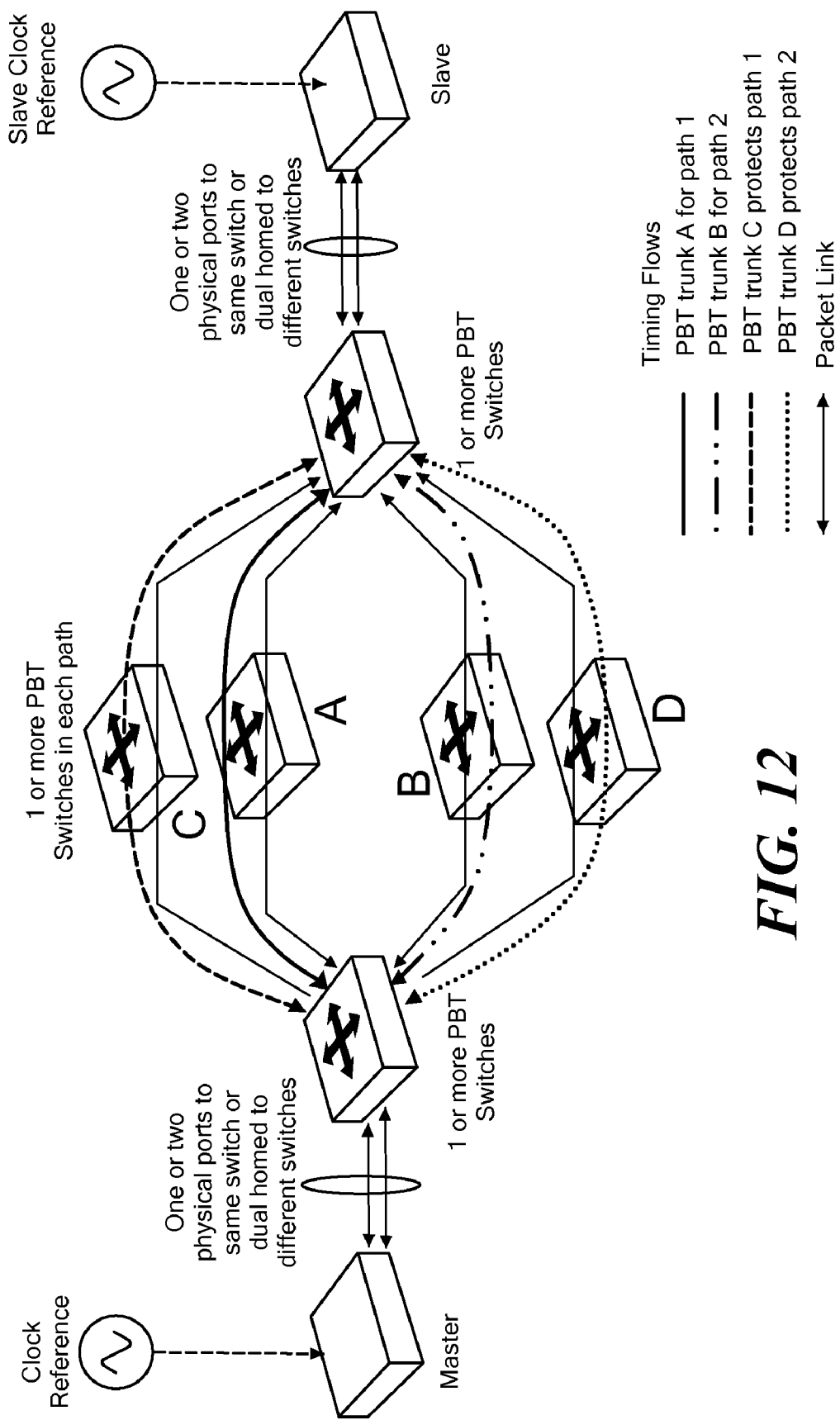
FIG. 12 shows a first example of how two partially independent routes may be configured in a PBT/PBB-TE Ethernet packet network, where the two routes may have independent path protection.

FIG. 12 shows a Provider Backbone Bridging—Traffic Engineering (PBB-TE) network in which two trunks A, B have been provisioned. PBB-TE is a technology which guarantees a particular routing between nodes for forward and reverse directions of data transfer and therefore is ideally suited to implementing the present invention. Trunk C can protect trunk A and trunk D can protect trunk B. Alternatively, a single protection trunk C may serve both trunks A and B. The trunks may terminate on the slave and master, or at points in the network spaced from the master and slave, as shown in FIG. 12.

Figure 13:
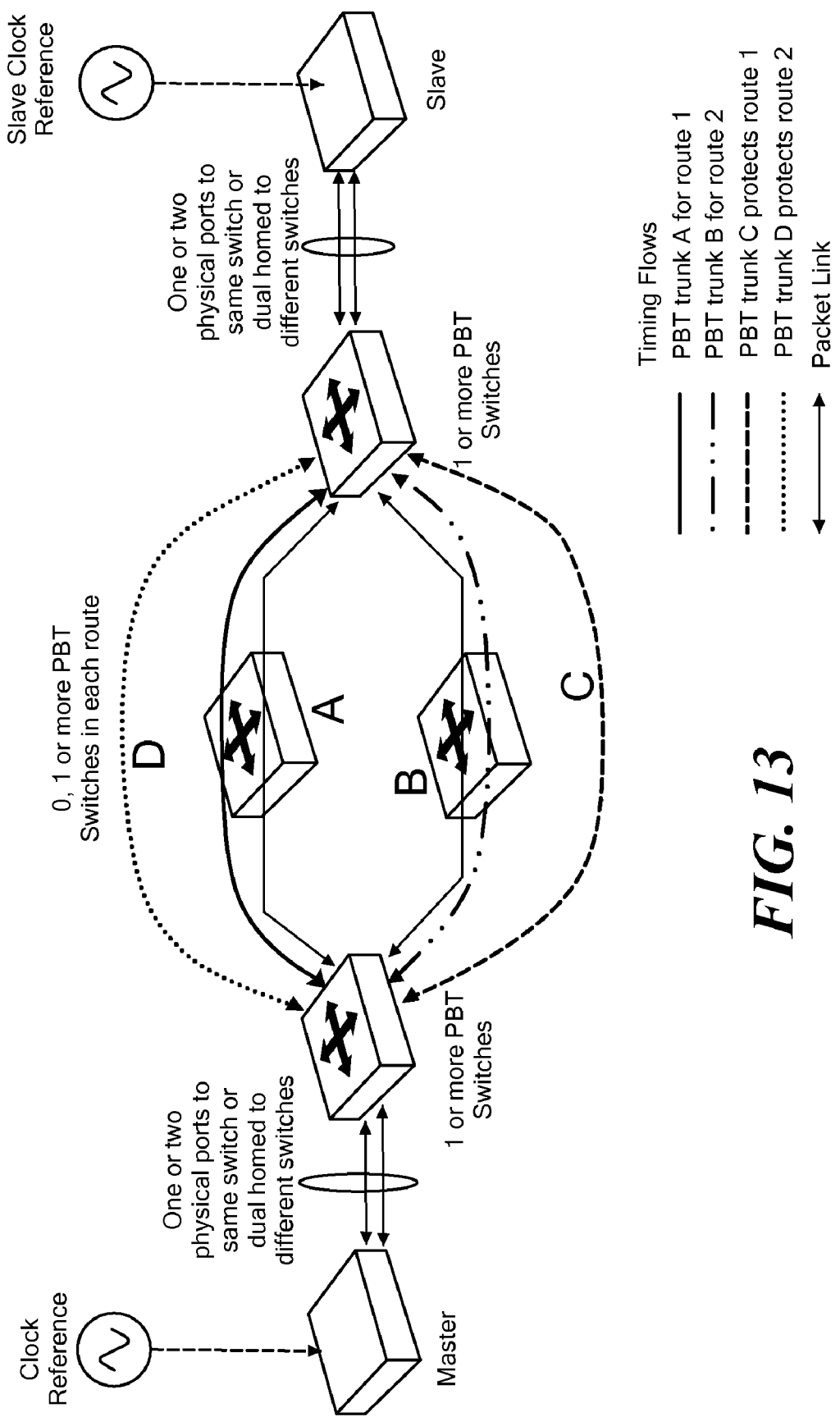
FIG. 13 shows another example of how two partially independent routes may be configured in a PBT/PBB-TE Ethernet packet network, where the two routes use the active and protected paths of a trunk pair.

FIG. 13 shows an alternative implementation in a PBB-TE network in which trunk A and trunk B are a protection pair, i.e. trunk B protects trunk A.

The difference in the measured property, for example transfer delay, can be arranged to be of any suitable amount (for requisite accuracy) by ensuring that the routes over which measurements are taken are physically diverse in at least one link (which will also have uncorrelated loads) and in general by (route selected for) nodal and link delay differences. Provided that the slave and master sample times are spaced in time no further apart than network load has time to change appreciably, the slave will accurately calculate its phase drift.

By measuring the roundtrip delay to and fro on each route, and/or inter-route roundtrip delays taken pairwise i.e. down one route and up another, a master can derive pairwise differences in delay for roundtrips, or for all the pairwise downward directions and/or pairwise upward directions. All these delays and their differences are measured using the master's reference clock alone, so as a direct consequence these measurements are always an accurate contemporaneous view of the packet network delay, including no phase offset. This should be contrasted with the prior art that cannot otherwise make delay measurements without including a factor of phase offset between the master and slave clocks.

A further possibility in addition to the above preferred method of measuring the difference of a property of the downward direction, for example transfer delays of each route of interest taken pairwise, is for the master and slave to measure the difference of a property for the upward direction, once again for example transfer delays of each route of interest taken pairwise. The slave may calculate this difference from a measurement of roundtrip delays of each route, and inter roundtrip delays up one route and down another. The master may measure these using route roundtrip delays, inter-route roundtrip delays, and/or the exact reverse of the second method of timestamped packets used to measure downward transfer delays previously described as employed by the slave.

The more instances of differences in a property that are measured for example roundtrip delays, and one-way transfer delays either directly measured for the downward and upward directions, or derived from route roundtrip delays and inter-route roundtrip delays, and which are employed in comparison between master and slave of the direct measurements or any filtered, averaged or statistically derived results, the greater the accuracy by which the slave may determine its clock frequency offset relative to the master's reference clock frequency, provided these instances are not correlated with one another in respect of the property being measured. This is because the phase drift of the slave will be correlated between the measurements it makes of each instance, whereas all effects of the network will tend to average out.

For all the above measurements it must be noted that packet network transfer delay on any route in any given direction may be changing due to switching noise disturbances, changing loads and also the frequency of the link speeds and the node speeds and even components in the nodes which may drift due to temperature disturbances and vibrations and other factors. All these processes may cause variations during the time interval over which measurements are made by the master and the slave. However these variations will for the most part be common to both the master and slave measurements of the same property, provided the measurements each makes are made relatively contemporaneous. Switching noise is a relatively stationary noise distribution for any given concatenation of links and nodes for which the load is at a relatively constant level of capacity, delay and packet length distribution. Switching noise is also relatively high frequency (packet to packet rather than sample to sample) and as a result can be readily filtered out over a succession of samples. Load can vary in terms of level compared with capacity, delay distribution and packet length distribution, however it is considered to be only a slow changing process relative to the master and slave measurements (which take only microseconds to a millisecond for most networks of interest) and therefore does not have a significant impact on measurement accuracy, especially as its effect is common-mode to both the master's and slave's measurements. (Master and slave are using the same routes for roundtrip measurements, or in the second method in which the slave may use the master's packets on arrival, the uplink is common to both measurements the master makes and therefore removed in the master's computation of the difference.) Only the most rapid of transients in load level when compared with sampling frequencies of the order of 10-100 Hz effected by the master and slave measurements may yield grossly differing results between contemporaneous samples, but these are expected to be very rare events. Furthermore this kind of behaviour can also be filtered out by appropriate averaging and windowing and statistical techniques.

Variations in link frequencies, node and node component frequencies can cause changes in the speed packets are forwarded and therefore the transfer delay between master and slave. Where these oscillators may be rated at 100 ppm or less, in every microsecond the drift of these oscillators can change the transfer delay by the order of 100 picoseconds or less. The accuracy desired for the frequency offset between the master and slave clocks is of the order of 50 ns for the more demanding of telecommunications applications. On any given route where there is a concatenation of several links and nodes, these oscillators will tend to average out their drift rather than add to the worst case. However, where there may be several such oscillators working in an additive mode, then ordinarily the master and slave need to account for this. This issue is especially true where absolute delays are being measured. However the present invention avoids this pitfall by both the master and slave measuring a property's difference between two or more routes roundtrip measurements, for which the drift effects of the links and nodes of both directions affect both master and slave equally where they are constant. Practically this is not always the case, so in general the slave must ensure that it is making its measurements as contemporaneously as possible with the master, which will in effect make constant any second order variability in link and node clock drift as both master and slave are sampling the network at the same time whatever the sampling interval. One means which ideally suits Ethernet networks that have delays in the order of microseconds, is that the slave starts the phase of its sampling on receiving a packet from the master, transmitted when the master begins its sampling. The phase of the slave's sampling will then be offset by the network transfer delay (which is very small), and thus the second order variability of the drift of network oscillators will remain the order of 100s of picoseconds or less.

The second embodiment does not suffer at all from the effects of network oscillator drifts and much less to its variability. The preferred means of the slave measuring route downward transfer delay measurements can be effected with the same packets the master uses to measure route and inter-route roundtrip delays. This means that the network oscillator drifts and second order variability will be common to both the master and slave measurements of the downward direction. Furthermore the differences the master derives by using inter-route roundtrip measurements such as transfer delays, given the upward directions are by definition common measurements, any network oscillator drift is eliminated when the difference is calculated and any second order variability between packet arrivals from each respective downlink is tiny by comparison.

Finally, a balance is readily struck between the ppb differences of the master and slave clocks that are to be corrected, their drift during sampling, the sampling frequency, contemporaneous sampling by master and slave, and the ppt second order variability in drift of link oscillators.

Embodiments of the invention have been described in which difference in transfer delay is used as a property of the network which the Master and Slave can measure. As described earlier, delay variation is an inherent aspect of packet network communication and, in general, there will be variability due to switching delays and load changes. It is therefore advantageous that, when measuring the property of transfer delay, the variation is filtered out to leave, typically, an average transfer delay. Any other suitable statistical aspect of the filtered distribution can be used consistently by the master and slave such as, for example: the minimum; the maximum; the delay one standard deviation from the norm; and any others known to those skilled in the art. However, it can also be useful to measure attributes of the transfer delay distribution at the master and slave. These attributes can be, for example, the difference between the minimum and maximum transfer delay values, the minimum and average transfer delay values, or any other combination of differences between statistical delays and distribution attributes can be measured over the available routes and inter-route by the master and the slave using their own clocks. Any discrepancies in these measurements would therefore be representative of changes in the network which can be filtered out, and any latent difference in frequency between the master and the slave clocks, which is intended to be corrected. The attributes of transfer delay distribution can be obtained using any of the embodiments described earlier. These attributes of the transfer delay distribution can be used instead of, or in addition to, the (filtered) measurement of transfer delay.

Node Induced Delay

Embodiments described above measure a difference in a transmission property which is observed between a pair of different routes through a network, such as an entirely distinct pair of roundtrip paths, or pairs of paths which have at least some part which is different. The different path lengths or loads of the pair of paths gives rise to the measurable difference.

A further embodiment of the invention is the ability to use a single route of one down and one up link between a first node and a second node, and to arrange for a measurable difference in a property on that route. The following description of various methods may also be applied in addition to the embodiments and measured properties of for route pairs. For example, as stated immediately above, this could be by both the slave and the master measuring differences between attributes of the transfer delay distribution of the roundtrip transfer delay. Another method is to deliberately arrange for either the first node or the second node to delay the transmission of a set of packets by certain amounts before sending them, in addition to a set of packets sent with normal transmission times. This method can be used to simulate the behaviour of two or more routes that have inherently different characteristics as described in the above embodiments. In either of these situations any of the above embodiments described according to measuring differences in transfer delay may be applied at the master and slave. For example where the master deliberately delays a set of packets, the master can measure the roundtrip delay time of a packet normally transmitted at its time of origin, with the delayed version of the same packet sent on the same route. The delay difference will be the amount by which the master delayed the packet plus any of the changes in statistical delays of the route in the interval in which both versions of the packet were transmitted. The slave may adopt an identical procedure to the master, applying an identical delay to a packet's clone to measure the roundtrip delay contemporaneously to the master, and then to compare its results with those of the master in order to adjust its clock frequency. This method of deliberately delaying a set of packets may also be used in the rare case where two or more routes are used that happen to have equal delay and no statistical variation by which a difference can be measured. For that application where the routes have a common upstream path, preferably the slave may more simply intercept the master's original packet and its delayed version and note the arrival times according to its own clock, and thereby directly determine the delay difference across the downstream direction of the route for comparison with the results the master obtains.

A special case of this general method of delaying packets, would be for a first and second node to use packets sent at regular intervals, where the first and second node consider any given packet to be a delayed version of the previous packet or any and all previous packets. For example where the master may transmit packets at regular intervals, a second packet may be considered in its own right as well as being a delayed version of a first packet, and so on for subsequent packets. The master may then measure any changes in delay on a single route by measuring delay differences between successive packets it has transmitted, and sending the results to the slave. The slave may adopt the same process, or may intercept the packets the master transmits and measure the changes in the downstream direction of the route as well as the original interval between packets sent at the master's clock frequency with reference to its own clock. The packets used by the master and the slave for this method may be one packet apart or N packets apart. Using this method the slave may adjust the frequency of its clock to be in step with that of the master.

It is additionally suitable for the purposes of this embodiment of the invention, independently or in addition to the above embodiments, for the first node or the second node to use a single route of one down and one up link between a first node and a second node, or to apply to one or more of multiple routes, to deliberately delay the transmission of a set of packets by a random or known variation. This may be the only set of packets transmitted or in addition to a set of packets sent with normal transmission times. Where a single route of one down and one up link is used between a first node and a second node, this technique would be applied to one of two sets of transmitted packets and may be used to simulate the behaviour of two or more routes having different characteristics. This is applicable to measurements of transfer delay or delay variance by the master and the slave. Where a two or more routes of one down and one up link each are used between a first node and a second node, this technique may be used to overcome the rare eventually where two or more routes would otherwise have equal characteristics and not yield a measurable difference. For example with two routes to the slave the master could apply a transmission variation to one set of packets destined for one route but not the other, or two different distributions for the packets transmitted on each route.

Different Packet Lengths

Figure 14:
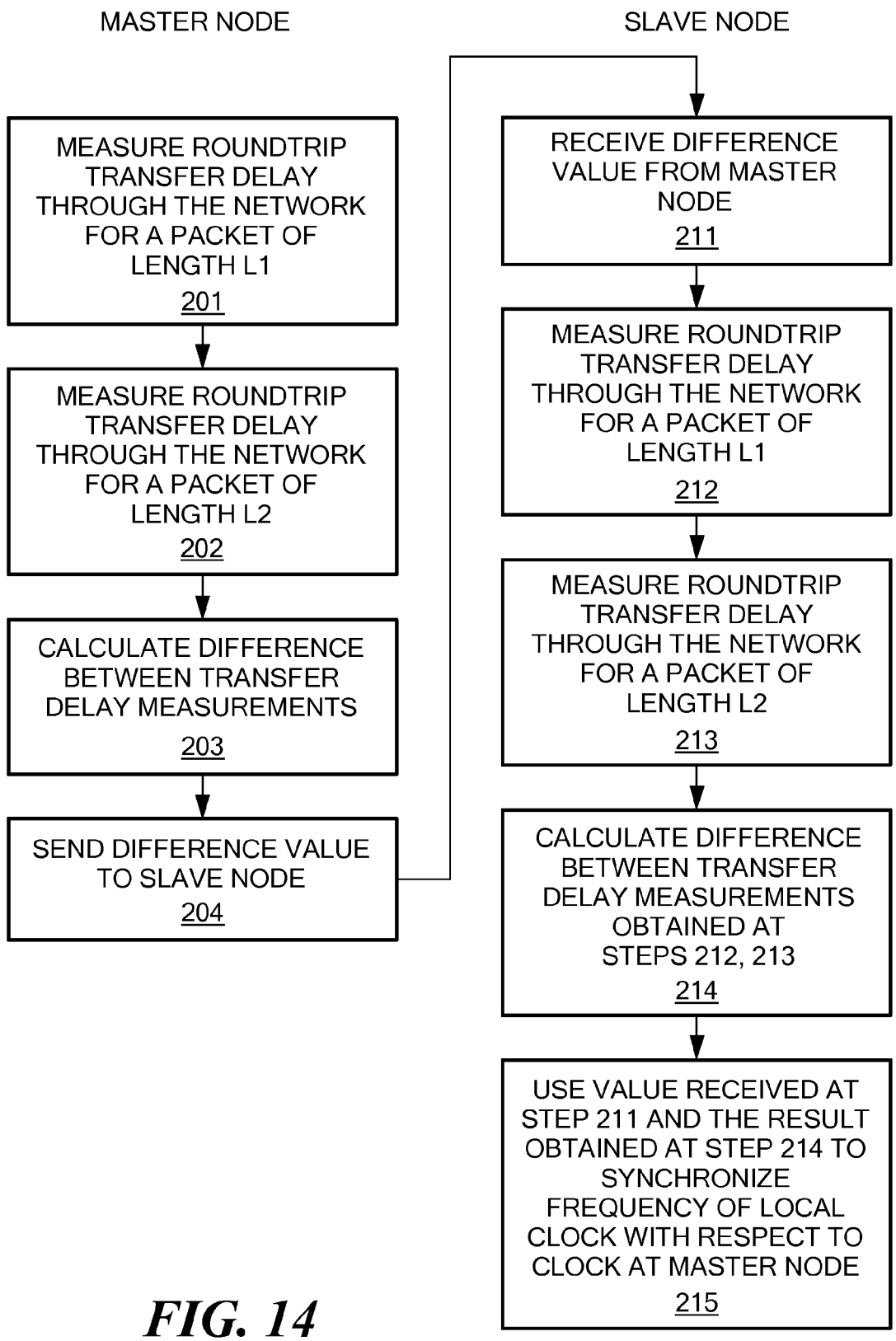
FIG. 14 shows an overview of a method to synchronize a clock at a slave node with a clock at a master node using packets of different lengths.

A further embodiment of the invention uses packets of different lengths, and measures the transfer delay difference on a single route or multiple routes. This method may be used instead of, or in addition to, any of the above embodiments. At any given link speed the transfer delay for a packet is proportional to the packet length. A significant aspect of packet switches is that they effectively store then forward, i.e. a packet is received in full before that packet is forwarded. Among several reasons for this behaviour is the limitation of packet network nodes that only a complete packet can be scheduled ahead of any others that may arrive contemporaneously, so each packet is received in its entirety before being scheduled for transmission. Accordingly, a short packet will be transferred more quickly than a longer packet, and the difference in transfer time will increase with the number of links and nodes traversed between master and slave. This difference in transfer time for packets of different length can be measured independently by a first node e.g. Master and a second node e.g. slave. This method is shown in FIG. 14 and can be summarised as:

Steps Performed at Master Node, 10
(1) measure roundtrip transfer delay over a first route for a packet of length L1 (step 201);
(2) measure roundtrip transfer delay over the first route for a packet of length L2 (where L2 is significantly different from L1) (step 202);
(3) determine difference value between the measurements obtained at step (1) and step (2) (step 203);
(4) send the difference value calculated at step (3) to a slave node (step 204).

Steps Performed at Slave Node, 20
(5) receive difference value from Master node (step 211);
(6) measure roundtrip transfer delay over the first route for a packet of length L1 (step 212);
(7) measure roundtrip transfer delay over the first route for a packet of length L2 (step 213);
(8) determine difference value between the measurements obtained at step (1) and step (2) (step 214);
(9) use the difference calculated at step (214) and the difference value received at step (211) to adjust the slave clock (step 215). Any discrepancy in this comparison of difference values is deemed to be directly due to a phase drift equivalent to a frequency offset between the slave clock and the master clock in the time intervals over which the measurements have been taken.

Alternatives for this method are:
step (1) and step (2) can make measurements of roundtrip transfer delay over different routes;
additional measuring steps, similar to step (1) and step (2), can make measurements of roundtrip transfer delay using different packet lengths over a second route. Pairwise differences can be calculated, in the same way as for the other embodiments previously described, and/or used to increase accuracy.
filter, average, or statistically process, multiple difference values (for the same route or routes) obtained at step (3), or multiple transfer delay measurements obtained at steps (1), (2) and send the processed value at step (4). This has the effect of removing packet switching jitter (relatively high frequency) to leave only load change-induced delay changes (relatively low frequency), but which is negligible for the interval in which the packet of lengths L1 and L2 are sent.
filter, average, or statistically process, multiple difference values obtained at step (8), or multiple transfer delay measurements obtained at steps (6), (7) and use the processed value at step (9).
The Master and Slave each acquire statistics and make use of the statistics to determine frequency synchronization.
The master and the slave use the respective direction of each route to send two or more sizes of packet.

A simplified method, which avoids the need to perform roundtrip measurements at the slave node is as follows:
(1) Master measures roundtrip transfer delay for a packet of length L1 sent via a particular route;
(2) Slave records time of arrival of the packet using it's own clock;
(3) Master measures roundtrip transfer delay for a packet of length L2 (where L2 is significantly different from L1) sent via the same route;
(4) Slave records time of arrival of the packet using it's own clock;
(5) Master determines difference value between the measurements obtained at step (1) and step (3);
(6) Slave determines difference value between the times recorded at step (2) and step (4);
(7) Master sends the difference value calculated at step (5) to Slave node;
(8) Slave receives the difference value sent at step (7);
(9) compare the difference calculated at step (6) and the difference value received at step (8);
(10) use result of step (9) to correct slave clock. Any discrepancy in the comparison of difference values at step (9) is deemed to be directly due to a phase drift equivalent to a frequency offset between the slave clock and the master clock in the time intervals over which the measurements have been taken.

Alternatives for this method are:
- step (1) and step (3) can make measurements of roundtrip transfer delay over different routes;
- additional measuring steps, similar to step (1) and step (3), can make measurements of roundtrip transfer delay using different packet lengths over a second route. Pairwise differences can be calculated, in the same way as for the other embodiments previously described, and/or used to increase accuracy.
- filter, average, or statistically process, multiple difference values (for the same route or routes) obtained at step (5), or multiple transfer delay measurements obtained at steps (1), (3) and send the processed value at step (7). This has the effect of removing packet switching jitter (relatively high frequency) to leave only load change-induced delay changes (relatively low frequency), but which is negligible for the interval in which the packet of lengths L1 and L2 are sent.
- filter, average, or statistically process, multiple difference values obtained at step (6), or multiple transfer delay measurements obtained at steps (7), (8) and use the processed value at step (10).
- The master and the slave use the respective direction of each route to send two or more sizes of packet
- In a PBB-TE network or equivalent network for which the number of links and nodes, and the speeds of the links and nodes is guaranteed to be equal in each direction, the master and the slave use each direction of a route independently, timestamping their packets at origin using their own clocks, and the arrival times of packets of two or more lengths sent by their peers, and determining the time dilation between the two or more lengths taken pairwise, the time dilation of the route in one direction from the slave being recorded by the master with any other statistics being transmitted to the slave, so that the slave may compare these results with similar results for packets of different length from the master, and use the processed value at step (10).
- The Master and Slave each acquire statistics and make use of the statistics to determine frequency synchronization.

As discussed previously it is impossible to calculate exactly the phase difference between two clocks due to not least transfer delay uncertainties in the communications channel(s) between them. Either the absolute transfer delay or the difference between an uplink and downlink are required. In packet networks the transfer delay uncertainty depends not least on:

1. fibre length equivalence and transport node count in each direction;
2. packet node type and count in each direction;
3. load level in each direction and its translation to delay variation;
4. non-linearity to load equivalence in each direction;
5. phase drift uncertainty between the two clocks.

PBB-TE (and equivalent network technologies) ensures that up and down links are co-routed, hence points 2 and 4 and to a great degree 1 are resolved. It must be noted though that there can still be a few microseconds difference between co-routed fibres for each direction over some distance because of dispersion effects, which may be large compared to the phase accuracy required. Network assisted frequency measurement as described in this patent above is intended to resolve point 5 above. The remaining issue is therefore in general is point 3—the different load level in each direction. The network assisted frequency measurement described herein is highly immune to load level and therefore heuristics focussed on resolving phase uncertainty can rely on there being no underlying phase drift correction requirement, only a correction for phase offset required.

Figure 15:
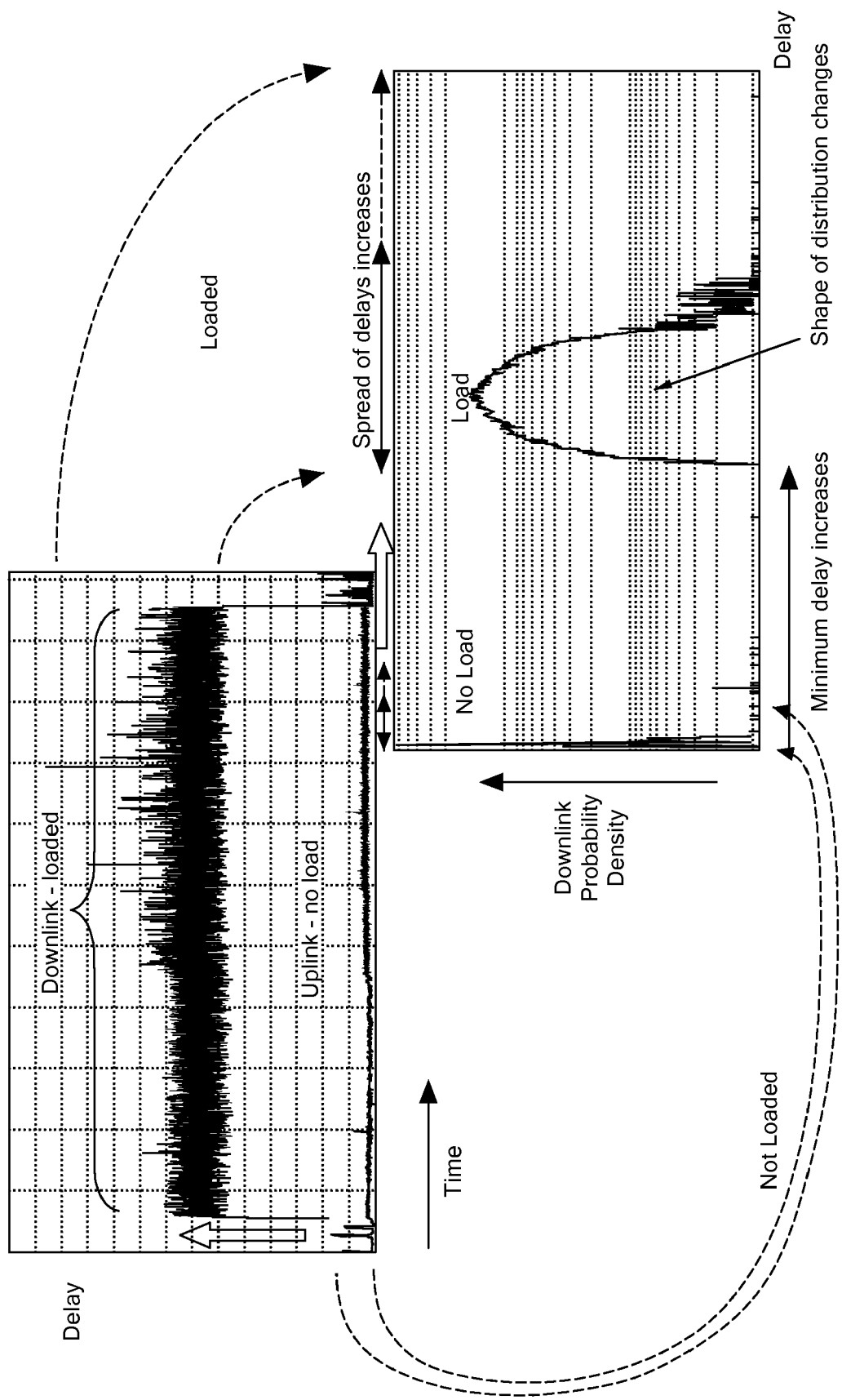
FIG. 15 shows how a packet network delay distribution varies under changing load.

FIG. 15 shows a typical effect of load on the transfer delay characteristics of a network. The figure contrasts a no-load (unloaded) situation with a 100%+loaded one in a three node network, showing the effect of low priority load traffic on high-priority traffic of interest that would be used for a synchronisation application. The graph top-left simply plots transfer delay against time, and begins and ends in the no-load state, where the step increase in transfer delay and delay "noise" is in response to an applied step load. The graph bottom-right processes the statistics of these delay samples as a histogram, and given the stark difference in delay and noise between the no-load and the loaded state, there are two distinct delay variation probability distribution functions (PDF) shown in the histogram. One can readily see that apart from the expected increase in noise (spread of the PDF) and shape (movement of mean and variance) when the load is applied, the minimum delay also increases. The reason for this is principally the effect of queues in any practical node implementation that must couple the dilated rates internal to the node with slower egress port speeds, especially where overhead must be added to the traffic and it traverses from inside the node to the egress port. This is in general an unavoidable aspect of a nodes design, although one solution that could be implemented that would avoid this is for the scheduler in control of the respective egress port to account for all overheads the traffic will experience, effectively modelling the entire traffic path. Otherwise the PDF is a stationary distribution for constant load, but the change in minimum delay has an enormous bearing on the uncertainty in transfer delay where this is used to determine phase offset. The goal is to determine the transfer delay of the unloaded network, or at least infer what that may be from statistics and knowledge of the behaviour of the network which in general is always carrying some traffic or effectively under load.

Figure 16:
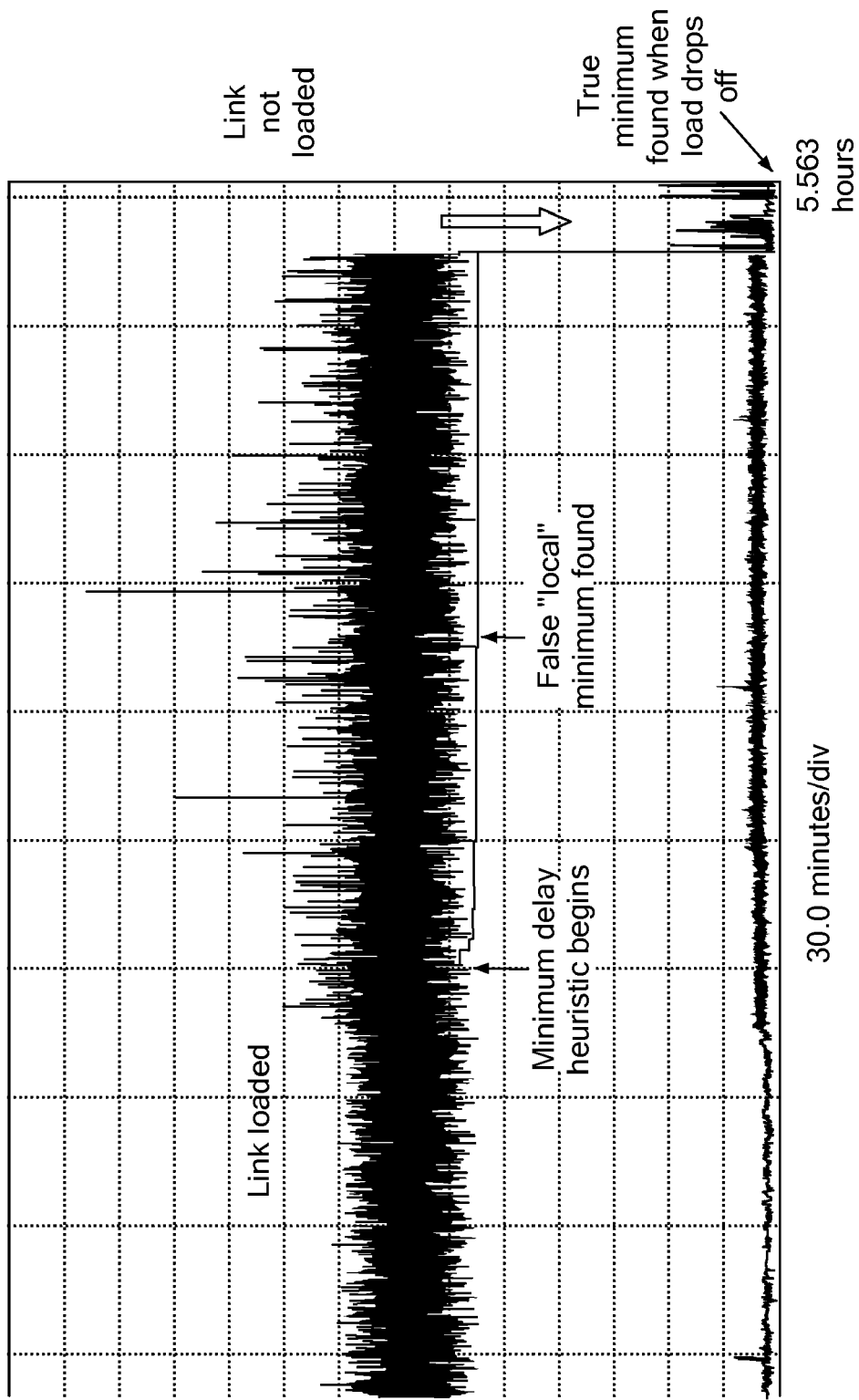
FIG. 16 shows how a heuristic may determine the minimum transfer delay through a packet network from the delay distribution which varies under changing load.

FIG. 16 shows the application of a minimum delay heuristic which aims to continuously record the minimum transfer delay on each route between master and slave, and vice versa. The true minimum delay will be equivalent to the non-loaded intrinsic delay of the route which depends on number of nodes and distance. The calculation of minimum delay includes a contribution of the phase offset of the slave clock relative to the master $$A\Delta ms = M\Delta ms - \Phi$$

$$A\Delta sm = M\Delta sm + \Phi$$

In a PBB-TE network or similar packet network where the two directions of a route are guaranteed to traverse the same links and nodes, the true minimum delay in each direction should be equal (apart from possible measurable differences in the fibres linking them). Where found to be not equal, then the phase of the slave should, and can be, corrected. The noisier (more dynamic) the (independent) loads on each direction of a route, the faster the heuristic will find the true minimum delay. Where the load may be slow changing or constant, a false minimum only may be found. False minimum delay can cause phase errors unless other steps are taken to detect this situation. The above method of introducing deliberate variation in the transmission times of packets sent by a first or second node can assist in finding the true minimum delay by the introduction of deliberate noise to overcome the effects of constant load.

The minimum delay heuristic cannot detect a route change e.g. due to protection switch that increases or decreases the transfer delay (intrinsically or through different load profile).

This can give rise to phase errors which may possibly be detected by the current minimum delay being below this new intrinsic delay in one direction and above it in the other. Other heuristics must also be used to detect a route protection switch. The minimum delay can be determined for more than one route at a time, and an "implied offset" comparison between the various routes permits determining if the slave's phase is offset consistently across all routes, or there may be discrepancies in the delay balance between each route's directions.

Figure 17:
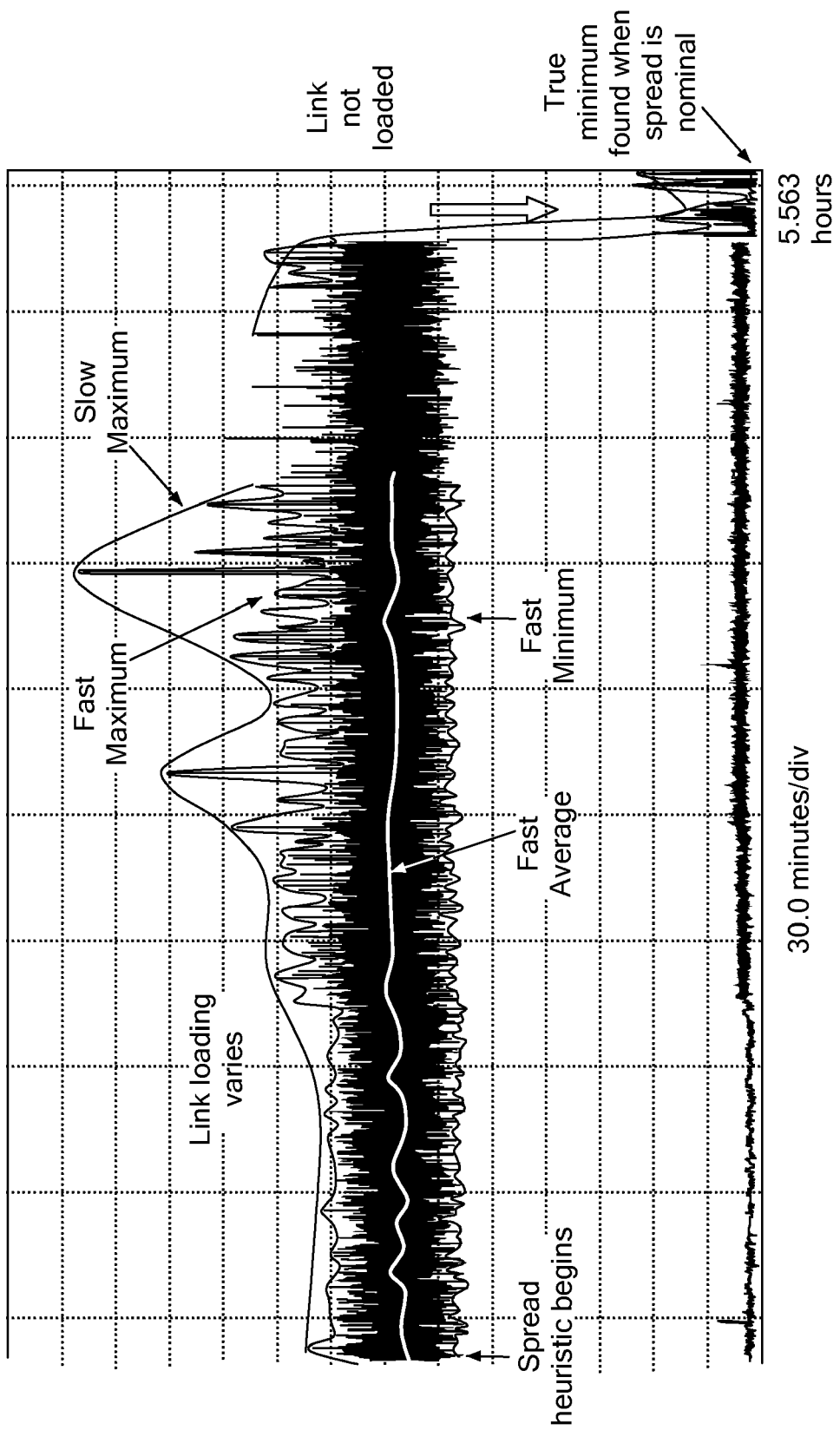
FIG. 17 shows how a heuristic may determine the minimum, average and maximum transfer delay through a packet network and the spread of the delay distribution which varies under changing load.

Referring again to FIG. 15, when a route is loaded, the following delay characteristics change:
An increase of the minimum transfer delay on the route
An increase of the spread or range of transfer delays—packet jitter
The shape of the distribution of packet jitter—probability density function (PDF) in terms of its mean and deviations FIG. 17 shows how a slave device can determine the min, mean and max, or mean and various deviations or other PDF metrics for packets traversing the route in a given period of time. The spread can be determined to be max-min, or the difference between any statistical metrics, variances or deviations etc. of the PDF. Where the spread is greater than a particular threshold (determined by the non-loaded spread) a clear indication is available that the route is loaded.

This ability to discriminate the presence or absence of load allows detection of a potential false minimum in the minimum delay heuristic, and can allow holding off any adjustment of the slave's phase. The PDF spread can be determined for several routes, and the route with minimum PDF spread selected as being a more accurate determinant for phase correction. Using PDF metrics a slave has the potential to predict the effective load and the minimum delay of the route by comparison to characterisation data of the nodes on the route. Again much of this can be measured in a PBB-TE network or similar network.

Fast repeated sampling of PDF metrics permits detecting faster load transients. This readily permits detection of any route protection switching, and allows reinitialising the minimum delay heuristic, e.g. a PBB-TE network fails both directions simultaneously, hence at least the minimum delay in both directions (if not other PDF metrics) will change simultaneously. This also allows faster selection of the best route when several routes are available. Slow sampling of PDF metrics permits determining slower changing load trends for stable PDF spread and best route assessment as well as the balance between each direction. The goal is to use as many routes as possible to determine the slave's phase offset.

The non-loaded intrinsic delay for each direction of any route could differ by a small amount that ideally should and may be corrected by the following:
The PDF spread can be used to disqualify all minimum delays that are not true minima
For all routes remaining for which the true minimum is available in both directions
Compute the difference in each direction, half of which is the predicted phase offset of the slave with respect to this route
Compute the minimum slave offset correction that is valid across all routes, e.g. least squares, RMS etc.

It is also possible to detect potential intrinsic delay offsets between the directions of any route by comparison of the differences between the true minima of co-directions of routes taken pairwise. Detection of this situation can be used to invoke or modify the strategy above.

A further heuristic can make use of different packet sizes (as similarly applied in the frequency synchronisation embodiment described earlier). Different packet sizes can be sent from master to slave on any given route. Each packet switching node must store a complete packet before it can be forwarded and the delay per packet size will vary for any given link speed. The ratio of the delays will be the ratio between packet sizes. If one assumes the following are invariant with packet size:
Distance causing delay
Load causing delay
The time for a node to forward a packet
Then the number of nodes on the route can be computed.

For any two packet sizes with delays per node P1 and P2 and total route delays Δ1 and Δ2:

$$\Delta 1 = \Delta nodes * P1 + \Delta distance + \Delta load$$

$$\Delta 2 = \Delta nodes * P2 + \Delta distance + \Delta load$$

Where, $\Delta nodes * P2 : \Delta nodes * P1 = P2 : P1$

Hence, $\Delta 2 - \Delta 1 = (P2:P1 - 1) \times \Delta nodes * P1$

\# nodes $= (\Delta 2 - \Delta 1)/(P2 - P1)$

Several different sizes and their pairwise ratios can be used to verify or refine the calculation. By determining the number of nodes on the route, and even the possibility to calculate the link speeds using the same technique, better decisions can be made in the above heuristics using minimum transfer delay and PDF spread.

The time-of-day is easily communicated from a master to a slave. However this epoch will be delayed a variable amount by the packet network, causing a time offset. Where the slave applies any corrections to phase it may apply the same corrections to the time-of-day. Once phase is then deemed to be corrected, the slave will be able to calculate the residual transfer delay on any route between the master and the slave, and apply an overall correction to its notion of time-of-day to be as close as possible to that of the master.

The invention is not limited to the embodiments described herein, which may be modified or varied without departing from the scope of the invention.

I claim:

1. A method of achieving frequency synchronization between a first clock at a first node and a second clock at a second node of a packet-carrying communications network, the method comprising:
measuring, at the first node, a property of packet transmission through the network between the first node and the second node;
sending the measurement of the property from the first node to the second node;
measuring, at the second node, the same property of packet transmission through the network;
using, at the second node, the measurement of the property made at the first node and the measurement of the property made at the second node to synchronize the frequency of the second clock with respect to the first clock; and
repeating the measuring at the first node, sending the measurement at the first node to the second node, measuring at the second node, and using the measurements at the second node to synchronize the frequency until a difference between the measurement at the first node and the measurement at the second node is less than a predetermined amount.

2. The method according to claim 1, wherein the step of measuring a property of packet transmission through the network comprises, at the first node:
- measuring a first transfer delay for sending a packet over a round trip path between the first node and the second node via a first route;
- measuring a second transfer delay for sending a packet over a round trip path between the first node and the second node via a second route; and,
- determining a first difference value between the first transfer delay and the second transfer delay.

3. The method according to claim 2, wherein the step of measuring the same property of packet transmission through the network comprises, at the second node:
- measuring a third transfer delay for sending a packet over a round trip path between the second node and the first node via the first route;
- measuring a fourth transfer delay for sending a packet over a round trip path between the second node and the first node via the second route;
- determining a second difference value between the third transfer delay and the fourth transfer delay,
- wherein the step of using the property comprises using the first difference value and the second difference value to synchronize the frequency of the second clock with respect to the first clock.

4. The method according to claim 2, wherein the first route and the second route are the same in the direction between the second node and the first node, the method comprising, at the first node:
- sending the first difference value to the second node;
and further comprising, at the second node:
- measuring a difference, using the second clock, between an arrival time of a packet sent by the first node via the first route and an arrival time of a packet sent by the first node via the second route;
- receiving the first difference value from the first node; and
- using the measured difference and the received first difference value to synchronize the frequency of the second clock with respect to the first clock.

5. The method according to claim 4, wherein the step of measuring a transfer delay sends an identifiable packet over a round trip path between the first node and the second node and an arrival time is recorded at the second node for the identifiable packet.

6. The method according to claim 4, further comprising including a timestamp within each of the packets.

7. The method according to claim 4, wherein each of the first route and the second route comprises a downlink leg and an uplink leg and wherein the first route and the second route have the uplink legs in common.

8. The method according to claim 1, further comprising:
at the second node:
- measuring a first transfer delay for sending a packet over a round trip path between the second node and the first node via a first route;
- measuring a second transfer delay for sending a packet over a round trip path between the second node and the first node via a second route, wherein the first route and the second route are the same in the direction between the first node and the second node;
- determining a first difference value between the first transfer delay and the second transfer delay; and
at the first node:
- measuring a difference, using the first clock, between an arrival time of a packet sent by the second node via the first route and an arrival time of a packet sent by the second node via the second route;
- sending the measured difference to the second node;
and further comprising, at the second node:
- using the measured difference and the received first difference value to synchronize the frequency of the second clock with respect to the first clock.

9. The method according to claim 8, wherein the step of measuring a transfer delay sends an identifiable packet over a round trip path between the second node and the first node and an arrival time is recorded at the first node for the identifiable packet.

10. The method according to claim 3, further comprising:
- measuring, at the first node, a fifth transfer delay for sending a packet over a round trip path between the first node and the second node via a third route; and
- determining a difference value between the fifth transfer delay and another of the transfer delays.

11. The method according to claim 2 wherein at least part of the first route is physically diverse from the second route.

12. The method according to claim 11, wherein the entire first route is physically diverse from the second route.

13. The method according to claim 2, wherein each of the first route and the second route comprises a downlink leg and an uplink leg and wherein the first route and the second route have one of the legs in common.

14. The method according to claim 1, further comprising at least one of: filtering, averaging and statistically processing a plurality of instances of the measured property over a period of time.

15. The method according to claim 2, wherein the first packet and the second packet are different lengths, and at least part of the first route and the second route are different.

16. The method according to claim 2, wherein the first packet and the second packet are different lengths, and the first route and the second route are identical.

17. The method according to claim 1, further comprising monitoring heuristics of packet transfer and using the monitored heuristics to synchronize phase of the second clock with respect to the first clock.

18. The method according to claim 1, wherein the property is at least one of: an attribute of transfer delay distribution; a difference in two attributes of transfer delay distribution.

19. The method according to claim 18, wherein the first node makes a measurable disturbance to packet transmissions sent from the first node.

20. The method according to claim 19, further comprising the first node transmitting a first identifiable packet and transmitting a second identifiable packet a delayed time after the first packet.

21. The method according to claim 20, wherein the first identifiable packet and the second identifiable packet are transmitted over the same round trip path between the first node and the second node.

22. The method according to claim 20, wherein the first identifiable packet and the second identifiable packet are transmitted over round trip paths between the first node and the second node which have different routings.

23. A method of achieving frequency synchronization between a first clock at a first node and a second clock at a second node of a packet-carrying communications network, the method comprising:
- measuring, at the first node, a first transfer delay for sending a packet over a round trip path between the first node and the second node;

measuring, at the second node, a second transfer delay for sending a packet over a round trip path between the first node and the second node via a second route;

sending the measured first transfer delay to the second node;

synchronizing the frequency of the second clock with respect to the first clock based on a difference between the first transfer delay and the second transfer delay, and repeating the steps of measuring, sending and synchronizing until a difference determined at the second node between the first transfer delay and the second transfer delay is less than a predetermined amount.

24. A method of achieving frequency synchronization between a first clock at a first node and a second clock at a second node of a packet-carrying communications network, the method comprising:

receiving, at the second node, a measurement taken at the first node of a first transfer delay of packet transmission through the network between the first node and the second node along a first round-trip path;

measuring, at the second node, a second transfer delay of packet transmission through the network between the first node and the second node along a second round-trip path; and using, at the second node, a difference between the first transfer delay and the second transfer delay to synchronize the frequency of the second clock with respect to the first clock; and repeating the steps of receiving, measuring, and using until a difference determined at the second node between the first transfer delay and the second transfer delay is less than a predetermined amount.

25. An apparatus for achieving frequency synchronization between a first clock at a first node and a second clock at a second node of a packet-carrying communications network, the apparatus comprising, at the first node:

a processor arranged to repetitively measure first packet transmission delay information concerning a first packet transmitted through the network between the first node and the second node which can be independently measured at the second node until a difference determined at the second node between the first packet transmission delay information and second packet transmission delay information concerning a second packet transmitted through the network between the first node and the second node and independently measured at the second node, is less than a predetermined amount; and an interface arranged to send the measurement of the first packet transmission delay information to the second node for use in synchronizing the frequency of the second clock with respect to the first clock.

26. An apparatus for achieving frequency synchronization between a first clock at a first node and a second clock at a second node of a packet-carrying communications network, the apparatus comprising, at the second node:

an interface at the second node arranged to receive a measurement taken at the first node of first packet transmission delay information concerning transmission of packets through the network between the first node and the second node; and a processor arranged to:
measure, at the second node, second packet transmission delay information concerning transmission of packets through the network between the first node and the second node; and comparing the measurement of the first packet transmission delay information made at the first node and the measurement of the second packet transmission delay information made at the second node to synchronize the frequency of the second clock with respect to the first clock based on the comparison; and the interface and the processor further arranged to repeat the receiving, measuring, and comparing until a difference determined at the second node between the first packet transmission delay information and the second packet transmission delay information is less than a predetermined amount.

27. The apparatus according to claim 26, wherein the first packet transmission delay information is a first difference value between a first measured transfer delay for sending a packet over a round trip path between the first node and the second node via a first route and a second measured transfer delay for sending a packet over a round trip path between the first node and the second node via a second route; and wherein the processor is arranged to measure the second packet transmission information by:

measuring a difference, using the second clock, between an arrival time of a packet sent by the first node sent via the first route and an arrival time of a packet sent by the first node sent via the second route; and, using the measured difference and the received first difference value to synchronize the frequency of the second clock with respect to the first clock.

28. The apparatus according to claim 26, wherein the processor is further arranged to:

measure a first transfer delay for sending a packet over a round trip path between the second node and the first node via a first route;

measure a second transfer delay for sending a packet over a round trip path between the second node and the first node via a second route, wherein the first route and the second route are the same in the direction between the first node and the second node;

determine a first difference value between the first transfer delay and the second transfer delay, receive a second difference value between an arrival time at the first node of a packet sent via the first route and an arrival time at the first node of a packet sent via the first route;

use the first difference value and the second difference value to synchronize the frequency of the second clock with respect to the first clock.

* * * * *